(12) United States Patent
Chang et al.

(10) Patent No.: US 10,571,257 B2
(45) Date of Patent: *Feb. 25, 2020

(54) SYSTEM AND METHOD FOR DETERMINING AN OPTIMAL CLOCKING ORIENTATION OF AN OBJECT

(71) Applicant: The Boeing Company, Chicago, IL (US)

(72) Inventors: Li Chun Chang, Mt. Pleasant, SC (US); Ronald J. Steckman, Johns Island, SC (US); Richard M. Coleman, Renton, WA (US); Joshua B. Guerry, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,860

(22) Filed: Jun. 18, 2019

(65) Prior Publication Data

US 2019/0310078 A1    Oct. 10, 2019

Related U.S. Application Data

(63) Continuation of application No. 15/376,354, filed on Dec. 12, 2016, now Pat. No. 10,371,506.

(51) Int. Cl.
    *G01B 11/245*    (2006.01)
    *G01B 11/00*     (2006.01)
    *G01B 11/27*     (2006.01)
    *B64F 5/00*      (2017.01)

(52) U.S. Cl.
    CPC .............. *G01B 11/245* (2013.01); *B64F 5/00* (2013.01); *G01B 11/002* (2013.01); *G01B 11/27* (2013.01)

(58) Field of Classification Search
    CPC ..... G01B 11/002; G01B 11/27; G01B 11/245; B64F 5/00
    USPC ..................................................... 356/139.04
    See application file for complete search history.

(56) References Cited

U.S. PATENT DOCUMENTS

| | | |
|---|---|---|
| 7,587,258 B2 | 9/2009 | Marsh |
| 8,789,837 B2 | 6/2014 | Chang et al. |
| 10,371,506 B2 * | 8/2019 | Chang ...................... B64F 5/00 |
| 2015/0043011 A1 | 2/2015 | Kaufman |

OTHER PUBLICATIONS

LEDDAR, Data sheet, retrieved Dec. 9, 2016.

* cited by examiner

*Primary Examiner* — Mark Hellner

(57) ABSTRACT

A system for determining an optimal clocking orientation of an object at which to attach mating structure to the object includes a plurality of radiation devices, a plurality of transceivers, and a processor. The radiation devices are mounted on the object which has an as-designed object configuration. The transceivers are configured to generate distance measurements between the transceivers and the radiation devices at different clocking orientations of the object. The processor is configured to determine, based on the distance measurements, as-built object configurations corresponding to the different clocking orientations of the object. The processor is configured to compare the as-built object configurations to the as-designed object configuration and determines an optimal clocking orientation at which the as-built object configuration has the smallest deviation from the as-designed object configuration.

20 Claims, 21 Drawing Sheets

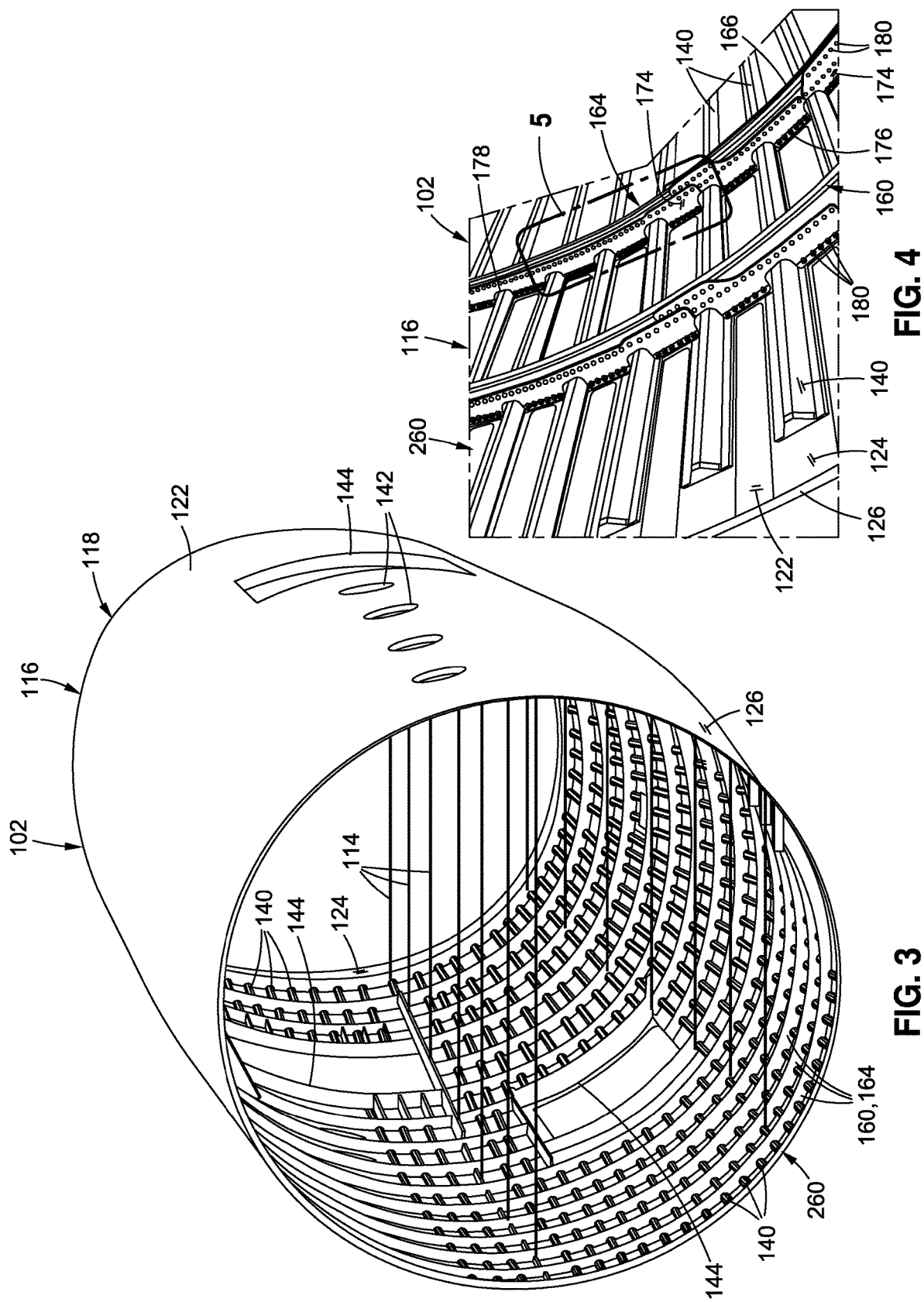

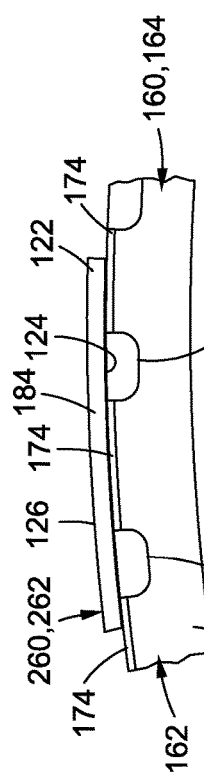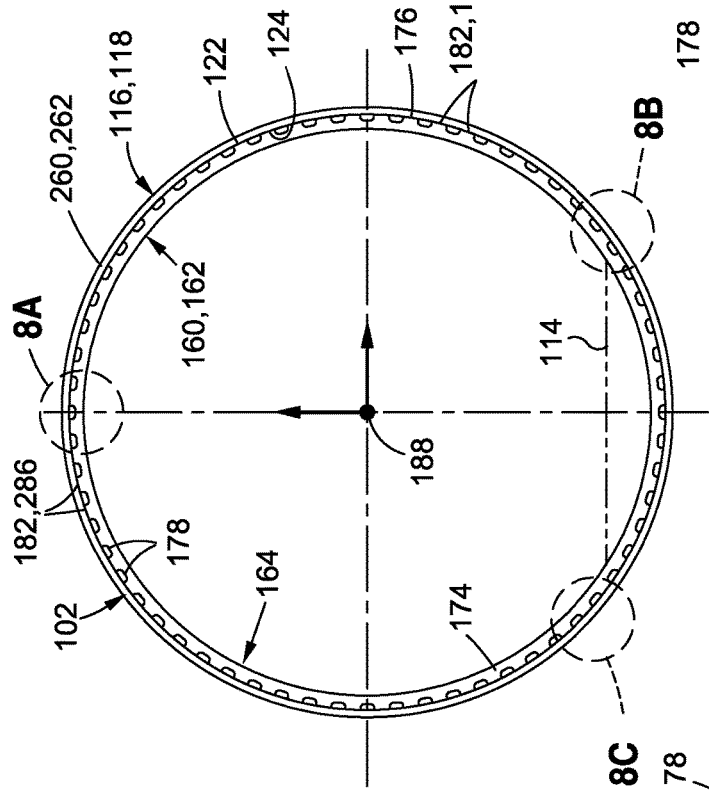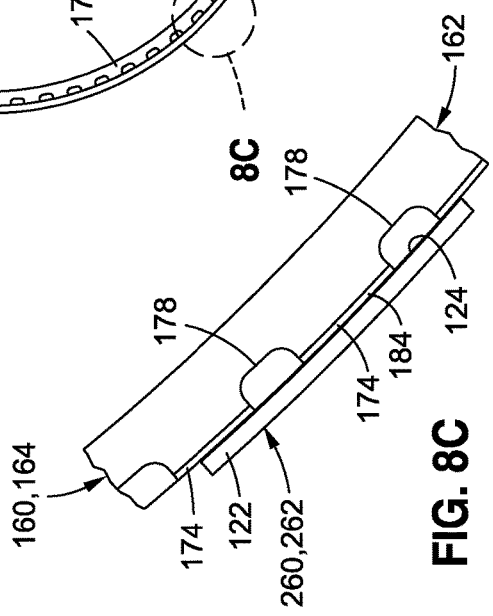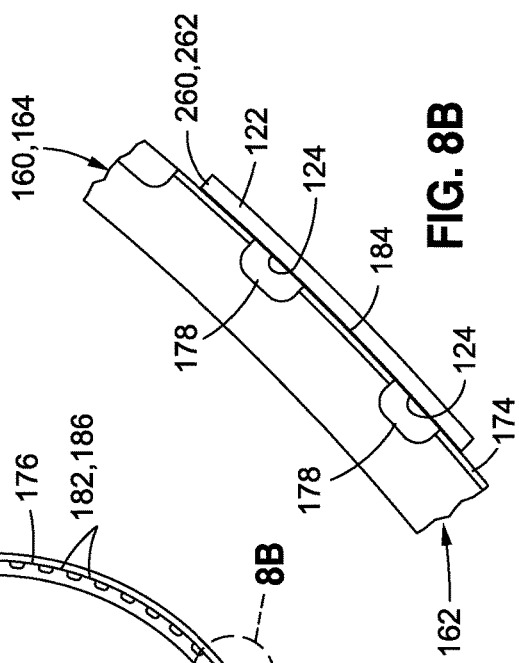

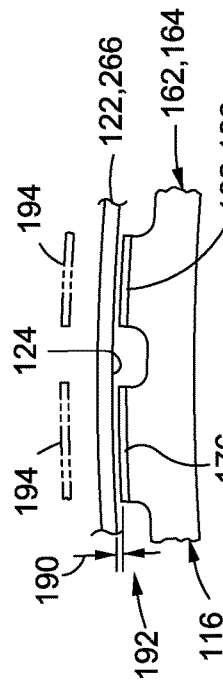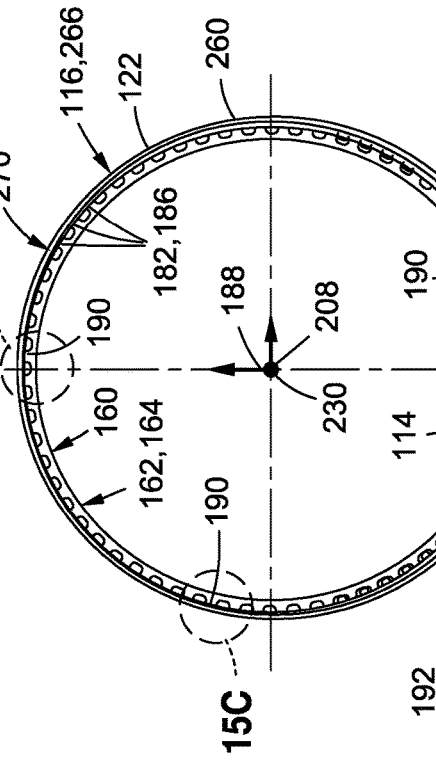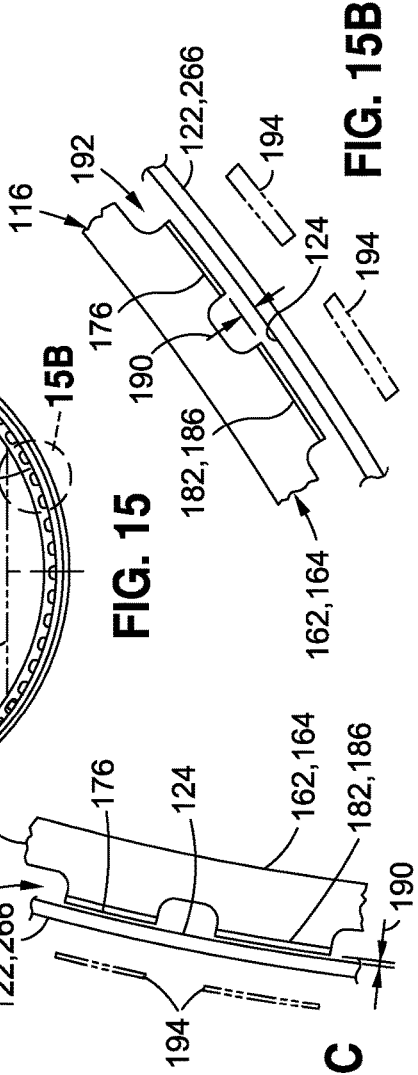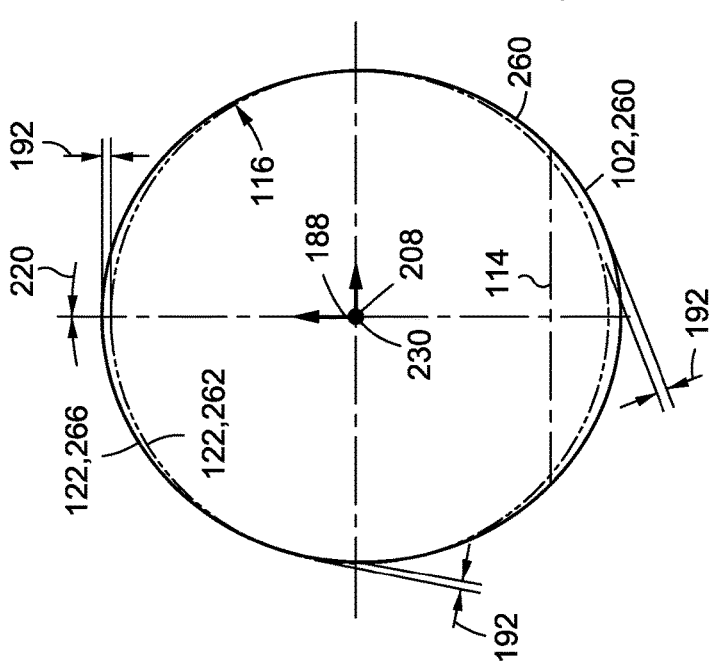
FIG. 15A
FIG. 15
FIG. 15B
FIG. 15C
FIG. 14

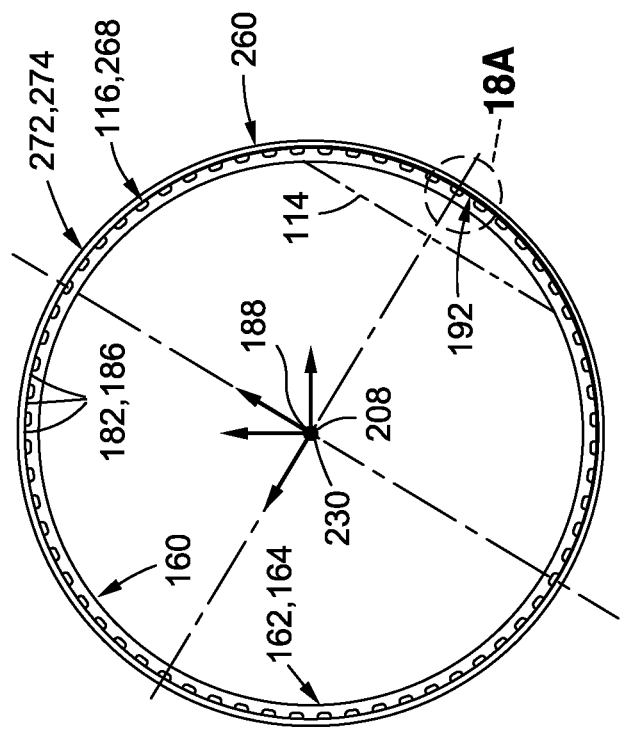
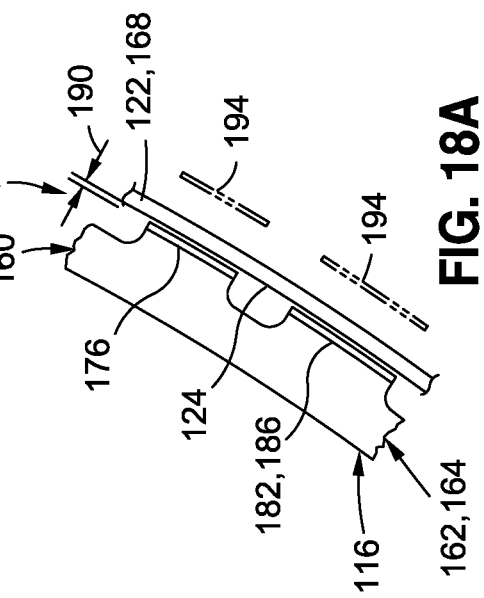
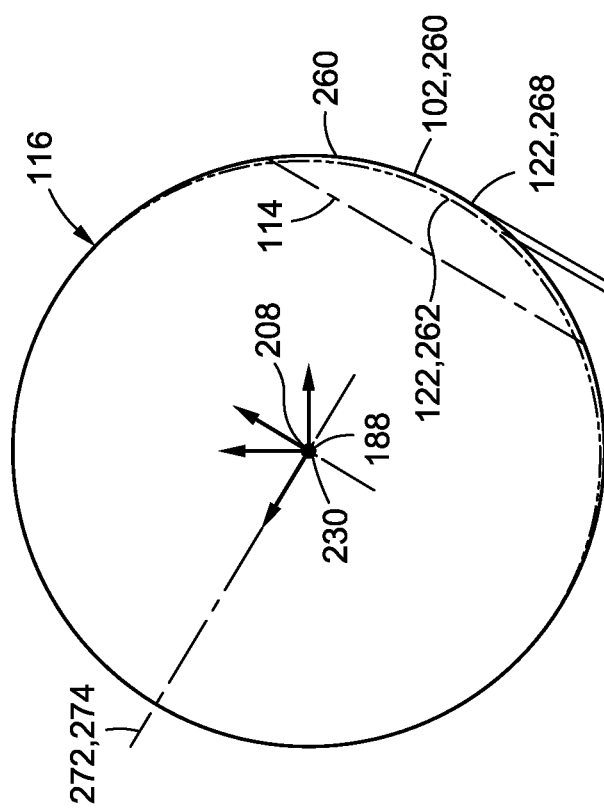

SYSTEM AND METHOD FOR DETERMINING AN OPTIMAL CLOCKING ORIENTATION OF AN OBJECT

CROSS-REFERENCE TO RELATED APPLICATIONS

The present application is a continuation of and claims priority to pending U.S. application Ser. No. 15/376,354 filed on Dec. 12, 2016, and entitled DYNAMIC DIMENSIONAL MEASUREMENT SYSTEM, the entire contents of which is expressly incorporated by reference herein.

FIELD

The present disclosure relates generally to measurement systems and, more particularly, to a system and method for determining an optimal clocking orientation of an object at which to attach mating structure to the object.

BACKGROUND

Composite structures are used in a wide variety of applications due to their high strength-to-weight ratio, good corrosion resistance, and other favorable properties relative to metallic structures. In aircraft construction, composites are used in increasing quantities to form the wings, the horizontal and vertical tail, the fuselage, and other components. For example, the fuselage of an aircraft may be manufactured by the end-to-end assembly of multiple composite barrel sections. Each barrel section may be formed by laying up composite plies over a plurality of longitudinal composite stringers supported on a rotatable layup mandrel. After curing, the barrel section may be removed from the layup mandrel and mounted on an assembly fixture to allow for the installation of internal mating structure. The opposing ends of the barrel section may be attached to the assembly fixture in a manner allowing for rotation of the barrel section. During installation of the internal mating structure, a series of axially-spaced circumferential frames may be installed inside the barrel section to maintain the cross-sectional shape of the barrel section and to support hoop loads imposed on the barrel section during cabin pressurization.

The circumferential frames may be placed in contact with the inner surfaces of the barrel section at a plurality of discrete mounting locations where the circumferential frames may be secured to the barrel skin using mechanical fasteners. However, when the barrel section is mounted on the assembly fixture, the portion of the barrel section located between the opposing ends is unsupported, causing the barrel section to assume an as-built configuration that deviates from the as-designed configuration. As a result of the deviation, unplanned gaps may occur at mounting locations where the circumferential frames are to be attached to the skin. For mounting locations wherein the gap size exceeds a predetermined maximum, shims must be installed prior to fastening the circumferential frames to the barrel skin. Unfortunately, the need to install a large quantity of unplanned shims significantly adds to the production flow time. At frame locations where the gaps are excessively large, it may be necessary to rework the circumferential frame, which further adds to the production flow time.

As can be seen, there exists a need in the art for a system and method for reducing the deviation between the as-built configuration and the as-designed object configuration of the barrel section as a means to reduce shimming and potential rework.

SUMMARY

The above-noted needs associated with deviations between an as-built object configuration and an as-designed object configuration are specifically addressed and alleviated by the present disclosure which provides a system for determining an optimal clocking orientation of an object at which to attach mating structure to the object. The system includes a plurality of radiation devices mounted on an object, a plurality of transceivers configured to emit radiation toward the object, and a processor communicatively coupled to the transceivers. The object potentially has a first as-built object configuration that differs from an as-designed object configuration. The transceivers continuously generate distance measurements between the transceivers and the radiation devices during rotation of the object about at least one rotational axis. The processor continuously receives the distance measurements and determines, based on the distance measurements, additional unique as-built object configurations corresponding to changing clocking orientations of the object during rotation. In addition, the processor compares the first and the additional as-built object configurations to the as-designed object configuration and, after completion of the rotation of the object through at least a portion of one revolution, determines an optimal clocking orientation at which the as-built object configuration has the smallest deviation from the as-designed object configuration.

In a further embodiment, disclosed is a system for determining an optimal clocking orientation of an aircraft structure at which to attach one or more arcuate frame assemblies to the aircraft structure. The system includes a plurality of radiation devices mounted on an aircraft structure, a plurality of transceivers configured to emit radiation toward the aircraft structure, and a processor communicatively coupled to the transceivers. The aircraft structure potentially has a first as-built aircraft structure configuration that differs from an as-designed aircraft structure configuration. The transceivers continuously generate distance measurements between the transceivers and the radiation devices during rotation of the aircraft structure about at least one rotational axis. The processor continuously determines, based on the distance measurements, additional unique as-built aircraft structure configurations corresponding to changing clocking orientations of the aircraft structure during rotation. In addition, the processor continuously compares the first and the additional as-built aircraft structure configurations to the as-designed aircraft structure configuration and, after completion of the rotation of the aircraft structure, determine an optimal clocking orientation at which the as-built aircraft structure configuration has the smallest deviation from the as-designed aircraft structure configuration.

Also disclosed is a method of determining an optimal clocking orientation of an object at which to attach mating structure to the object. The method includes supporting an object on an assembly fixture having at least one rotational axis. The object has a plurality of radiation devices mounted on the object. The object potentially has a first as-built object configuration that differs from an as-designed object configuration. The method additionally includes rotating the assembly fixture and object about the at least one rotational axis, and continuously scanning, using a plurality of transceivers, the object and continuously generating distance measurements between the transceivers and the radiation devices during rotation of the object. The method also includes continuously determining, using the distance measurements transmitted to a processor, additional unique as-built object configurations based on the distance measurements. Each as-built object configuration corresponds to a unique clocking orientation of the object during rotation. Furthermore, the method includes continuously comparing the first and the additional as-built object configurations to the as-designed object configuration, and determining, after completion of the rotation of the object through at least a portion of one revolution, an optimal clocking orientation at which the as-built object configuration has the smallest deviation from the as-designed object configuration.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a perspective view of an aft barrel section of the fuselage;

FIG. 4 is a magnified perspective view of a portion of the interior of the aft barrel section of FIG. 3 illustrating a plurality of longitudinal stringers integral with a barrel skin, and further illustrating axially spaced arcuate (e.g., circumferential) frame assemblies fastened to the barrel skin;

FIG. 8 is a sectional view of the barrel section of FIG. 7 taken along line 8 and illustrating the barrel skin in an as-designed object configuration and the mating structure (e.g., the arcuate frame assembly) in an as-designed mating structure configuration;

FIGS. 8A-8C are magnified views of different locations around the circumference of the barrel section and illustrating a lack of gaps at the interface between the arcuate frame assembly and the barrel skin;

FIG. 14 is a schematic diagram of the barrel skin of FIG. 12 illustrated in solid lines in the first as-built object configuration corresponding to the first clocking orientation, and further illustrating locations around the circumference of the barrel skin where the first as-built object configuration of the barrel skin deviates from the as-designed object configuration of the barrel skin shown in phantom lines;

FIG. 15 is a sectional view of the barrel section of FIG. 12 in the first as-built object configuration shown in FIG. 14, and illustrating an arcuate (e.g., circumferential) frame assembly in the as-designed mating structure configuration;

FIGS. 15A-15C are magnified views of portions of deviation locations around the circumference of the barrel section of FIG. 15 where out-of-tolerance gaps exist between the arcuate frame assembly in the as-designed mating structure configuration and the barrel skin in the first as-built object configuration;

FIG. 17 is a schematic diagram illustrating in solid lines an additional as-built object configuration of the barrel skin of FIG. 16 corresponding to the additional clocking orientation, and further illustrating a location where the additional as-built object configuration of the barrel skin deviates from the as-designed object configuration of the barrel skin shown in phantom lines;

FIG. 18 is a sectional view of the barrel section of FIG. 16 in the additional as-built object configuration shown in FIG. 17, and illustrating an arcuate (e.g., circumferential) frame assembly in the as-designed mating structure configuration;

FIG. 18A is a magnified view of a portion of a deviation location on the circumference of the barrel section of FIG. 18 where out-of-tolerance gaps exist between the arcuate frame assembly in the as-designed mating structure configuration and the barrel skin in the additional as-built object configuration;

DETAILED DESCRIPTION

Figure 1:
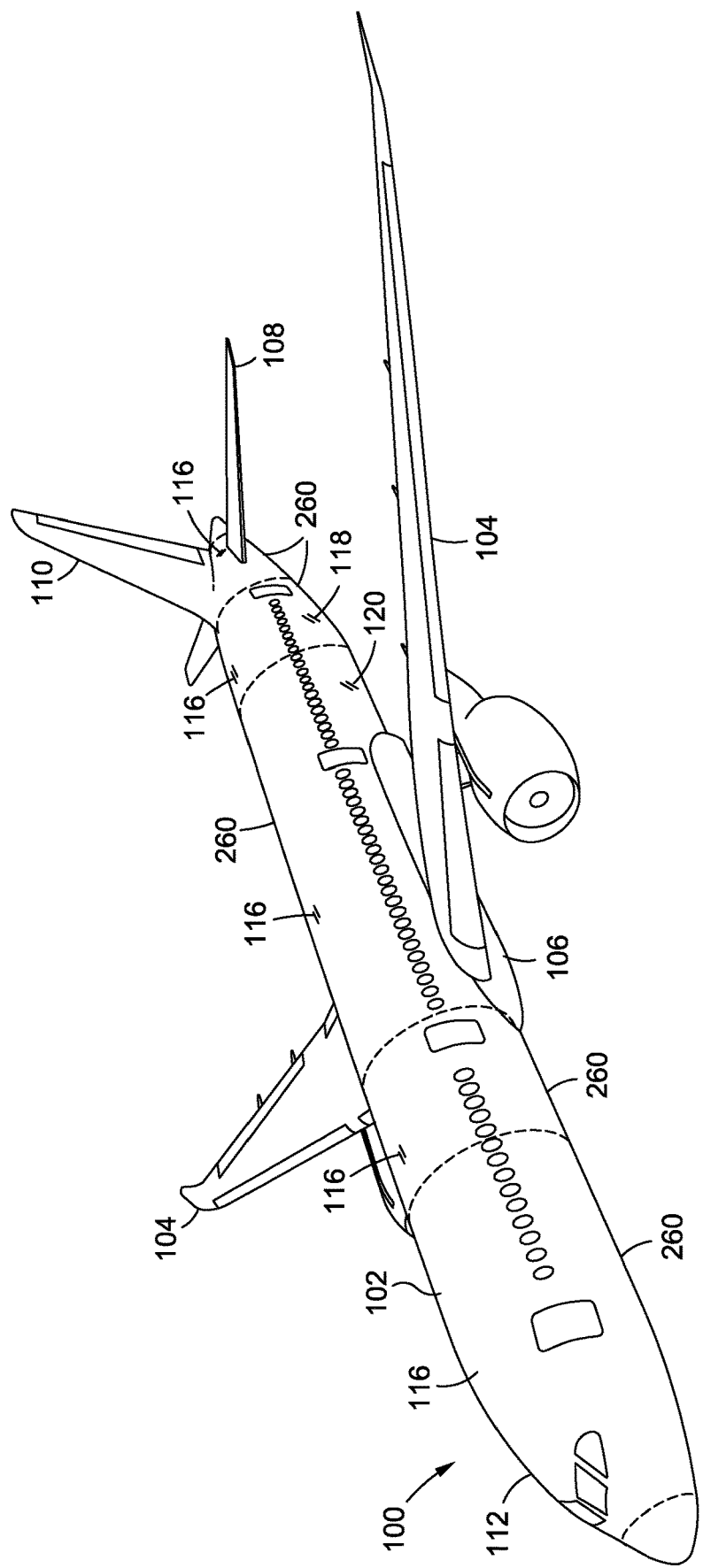
FIG. 1 is a perspective view of an aircraft.

Referring now to the drawings wherein the showings are for purposes of illustrating preferred and various embodiments of the disclosure, shown in FIG. 1 is a perspective view of an aircraft 100 which may include one or more objects 260 (e.g., aircraft structures 102) for which the presently-disclosed system 240 (FIG. 12) and method 300 (FIG. 25) may be implemented for determining an optimal clocking orientation 274 of the aircraft structure 102 at which to attach mating structure 160 to the aircraft structure 102. The aircraft 100 includes a fuselage 112 to which are attached a pair of wings 104 via a wing center section 106. In addition, the aircraft 100 includes a horizontal tail 108 including a horizontal stabilizer and elevator, and a vertical tail 110 including a vertical fin and rudder. The fuselage 112 may be made up of a series of barrel sections 116 represented by the dashed lines in FIG. 1. The barrel sections 116 may be separately manufactured and then assembled end-to-end to form the fuselage 112.

Figure 2:
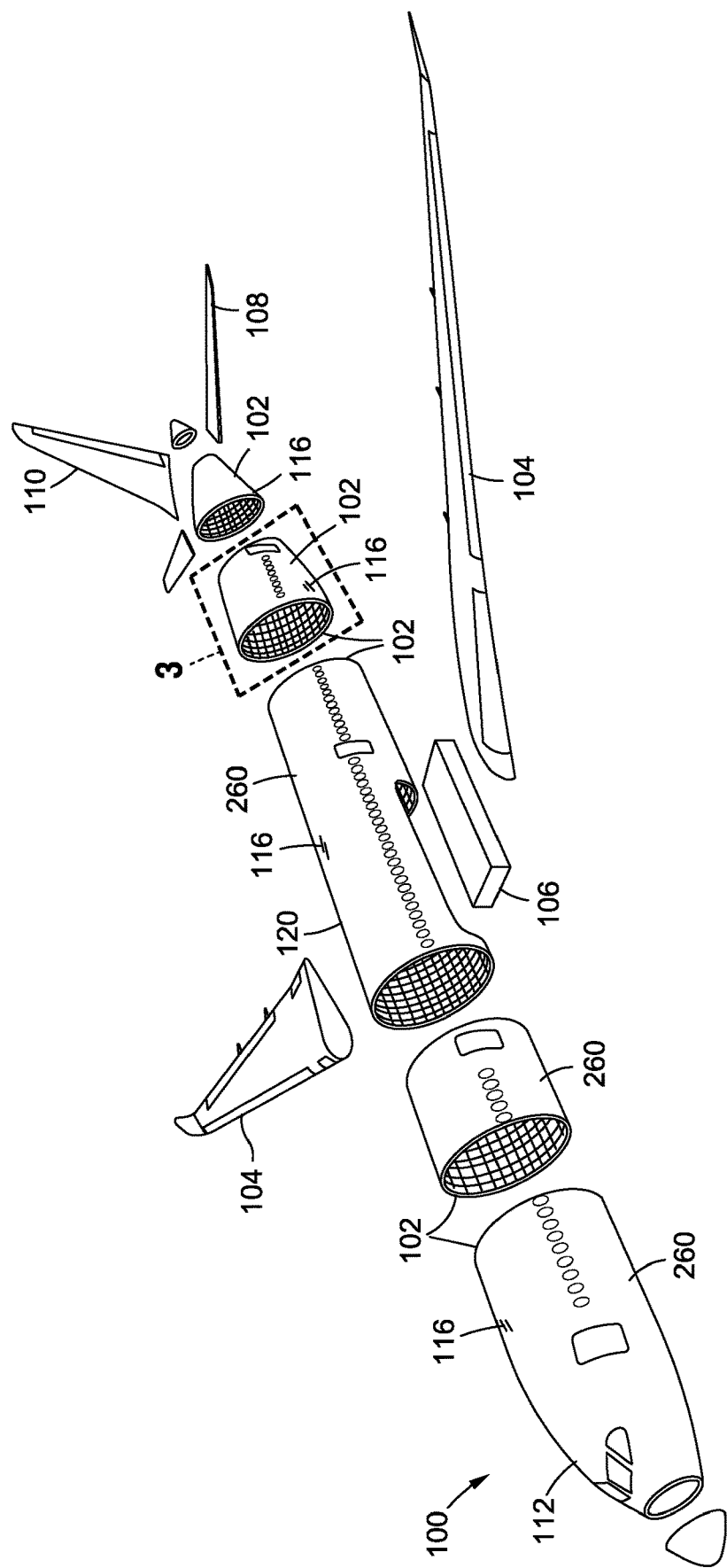
FIG. 2 is a perspective view of the aircraft of FIG. 1 separated into a plurality of separately-manufactured objects (e.g., aircraft structures) including a plurality of fuselage barrel sections.

FIG. 2 illustrates the barrel sections 116 (e.g., aircraft structures 102) of the fuselage 112 separated from one another and separated from the wings 104, the wing center section 106, the vertical tail 110, and the horizontal tail 108. The presently-disclosed system 240 (FIG. 12) and method 300 (FIG. 25) is described in the context of determining an optimal clocking orientation 274 of the aft barrel section 118 at which the as-built configuration of the aft barrel section 118 has the smallest deviation from the as-designed configuration of the aft barrel section 118. The optimal clocking orientation 274 of the aft barrel section 118 may by the clocking orientation at which to attach mating structure 160 to the aft barrel section 118 with the minimal amount of mismatch and/or shimming required.

In the present disclosure, the as-designed configuration of an object 260 or a mating structure 160 may be described as the configuration in which all of the dimensions of the object 260 or mating structure 160 are the theoretical or exact design dimensions of the object 260 or mating structure 160. The as-built configuration of an object 260 or mating structure 160 may be described as a configuration that has been manufactured and in which one or more of the dimensions of the object 260 or mating structure 160 deviates from the corresponding exact design dimension by an amount that may or may not be outside of a predetermined tolerance band assigned to the exact design dimension. Advantageously, the presently-disclosed system 240 (FIG. 12) and method 300 (FIG. 25) minimizes the deviation of the as-built configuration from the as-designed configuration such that shimming may be minimized between the object 260 (e.g., a barrel section) and the mating structure 160 (e.g., arcuate frame assemblies 164) to be attached to the object 260.

The mating structure 160 may include internal mating structure and/or external mating structure. For a fuselage barrel section 116, one example of internal mating structure is the axially-spaced arcuate (e.g., circumferential) frame assemblies 164 to be installed inside the barrel section 116. Alternatively or additionally, the mating structure 160 may include external mating structure. For example, the system 240 (FIG. 12) and method 300 (FIG. 25) may be implemented for determining an optimal clocking orientation 274 of the aft barrel section 118 that minimizes deviation or mismatch between the cross-sectional shape and/or size of a forward end of the aft barrel section 118 and the cross-sectional shape and/or size of an aft end of the mid-fuselage barrel section 120, thereby allowing the adjoining barrel sections 116 to be spliced together using circumferential spice elements (not shown) with reduced shimming. In another example, the system 240 and method 300 may be implemented for determining an optimal clocking orientation 274 of the aft barrel section 118 that minimizes shimming at structural connections (not shown) between the aft barrel section 118 and the horizontal stabilizer and/or between the aft barrel section 118 and the vertical fin.

Although described in the context of determining the optimal clocking orientation 274 of an aft barrel section 118 (e.g., an aircraft structure 102), the presently-disclosed system 240 (FIG. 12) and method 300 (FIG. 25) may be implemented for determining the optimal clocking orientation 274 of any one of a variety of different types of objects 260 having any one a variety of different sizes, shapes, and configurations. For example, the system 240 and method 300 may be implemented for determining the optimal clocking orientation 274 of an object 260 having a closed cross-section such as the barrel section 116 described and illustrated in FIGS. 1-20, or any other closed-cross-section object 260. In addition, the system 240 and method 300 may be implemented for determining the optimal clocking orientation 274 of an object 260 having an open cross-section, including a contoured panel section 130 (e.g., aircraft structure 102) such as a half panel or a quarter panel of a fuselage 112 as described below and illustrated in FIGS. 21-24, or any other type of open-cross-section object 260. The object 260 and/or mating structure 160 may be formed of any one of a variety of different types of materials including metallic material and/or non-metallic material. For example, the object 260 and/or mating structure 160 may be formed of composite material such as fiber-reinforced polymer matrix material (e.g., carbon-fiber-reinforced epoxy resin).

Referring briefly to FIGS. 10-20 and 23-24 described in greater detail below, the presently-disclosed system 240 and method 300 (FIG. 25) incorporates the use of a plurality of radiation devices 250 (e.g., FIG. 13), a plurality of transceivers 252 (e.g., FIG. 13), and a processor 278 (e.g., FIG. 13). The plurality of radiation devices 250 are mounted on the object 260 (e.g., FIG. 10). The object 260 potentially has a first as-built object configuration 266 (FIGS. 14-15) that differs from the as-designed object configuration 262 (FIGS. 14-15) of the object 260. The transceivers 252 (FIGS. 11-13, 19-20 and 23-24) are mounted remotely from the object 260. The transceivers 252 emit radiation 254 toward the object 260 (FIGS. 13, 16, 20, and 24) and receive radiation 254 back from the radiation devices 250 and, based on the radiation 254 emitted and received, the transceivers 252 continuously generate distance measurements between the transceivers 252 and the radiation devices 250 during rotation of the object 260 about at least one rotational axis. For example, an object 260 may be rotated about a single rotational axis 208 illustrated in FIGS. 13, 16, 20, and 24.

Alternatively, an object 260 may be rotated about two or more rotational axes (not shown). For example, an object 260 (e.g., a barrel section 118) may be rotated about a first rotational axis (e.g., the rotational axis 208) while being simultaneously rotated about a second rotational axis (not shown) oriented orthogonal to the first rotational axis. Alternatively, an object 260 may be rotated about two or more rotational axes in a sequential manner. For example, an object 260 may be rotated about a first rotational axis, after which the object 260 may be rotated about a second rotational axis (not shown) oriented orthogonal to the first rotational axis. In any one of the embodiments of the presently-disclosed system and method, an object 260 may be rotated through at least a portion of one revolution about at least one rotational axis, or an object 260 may be may be rotated through a complete 360-degree revolution. Even further, in examples where an object 260 is rotated about two or more rotational axes, the object 260 may be rotated through multiple 360-degree revolutions about one rotational axis while being simultaneously rotated through at least a portion of a revolution about another rotational axis in order to determine one or more optimal clocking orientations of the object 260 at which to attach mating structure 160 to the object 260.

Referring still to FIGS. 10-20 and 23-24 described below, the processor 278 (FIGS. 13, 16, 20, and 24) is communicatively coupled to the transceivers 252. The processor 278 continuously determines, based on the distance measurements, a first as-built object configuration 266 and additional unique as-built object configurations 264 corresponding to changing clocking orientations of the object 260 during rotation about the rotational axis 208. The processor 278 may continuously convert the instantaneous distance measurements into instantaneous positional data by correlating the instantaneous distance measurements to the instantaneous clocking angle of the object 260. The processor 278 may use the instantaneous positional data to determine the as-built object configuration corresponding to the instantaneous clocking orientation. The instantaneous clocking angle may be continuously provided to the processor 278 by a rotary encoder (not shown) or other device for continuously generating clocking angle data during rotation of the object 260. In one embodiment, a rotary encoder may be included with a rotator motor 206 (FIGS. 10-11) of an assembly fixture 214 (FIGS. 10-11) rotatably supporting the object 260, as described below. The processor 278 compares the first and additional as-built object configurations 266, 268 to the as-designed object configuration 262 represented by a computer-aided-design (CAD) model (FIG. 13) and, after completion of the rotation of the object 260 through at least a portion of one revolution about the rotational axis 208, the processor 278 determines the optimal clocking orientation 274 at which the as-built object configuration 264 has the smallest deviation from the as-designed object configuration 262.

In the present disclosure, in some examples, the completion of rotation of an object 260 may be described as the termination of rotation of the object 260 through a portion of a 360-degree revolution (e.g., a rotation of 90 degrees) about a rotational axis. Alternatively, in other examples, the completion of rotation of an object 260 may be described as the termination of rotation of an object 260 through a complete 360-degree revolution about a rotational axis. In still other examples, the completion of rotation of an object 260 may be described as the termination of rotation of the object 260 through multiple 360-degree revolutions about one rotational axis, such as when the object 260 is being simultaneously rotated about another rotational axis.

Referring now to FIG. 3 shown is a perspective view of an aft barrel section 118 (e.g., an object) for which the optimal clocking orientation 274 may be determined. In the example shown, the aft barrel section 118 may include a barrel skin 122 formed of a plurality of composite plies which may be laid up at different ply thicknesses at different locations of the barrel section 116, resulting in stiffness variations at different locations of the barrel section 116. The barrel skin 122 may include one or more cutouts such as one or more windows 142 and/or doors 144 which may add to the stiffness variations throughout the barrel section 116. In the example shown, the aft barrel section 118 has a generally cylindrical tapered shape. However, the barrel section 116 may be non-tapered as illustrated in FIG. 1 for the forward and mid-fuselage barrel sections 116. In addition, the barrel section 116 may be provided in a cross-sectional shape that may be non-circular and/or is either symmetrical or non-symmetrical about a plane perpendicular to a vertical centerline of the barrel section 116. Mating structures 160 may be mounted to the barrel section 116 such as the floor beams 114 shown in FIG. 3, the above-mentioned arcuate frame assemblies 164, and other mating structures 160.

FIG. 4 is a magnified view of a portion of the interior of the aft barrel section 118 showing the longitudinal stringers 140 which may be co-cured or co-bonded to the barrel skin 122. Alternatively, the stringers 140 may be adhesively bonded and/or mechanically fastened to the barrel skin 122 after final cure of the barrel skin 122. For a composite barrel skin 122, the stringers 140 are preferably formed of composite material. However, the stringers 140 may be formed of metallic material. In an example not shown, the stringers 140 may be omitted from the barrel section 116. Also shown in FIG. 4 are the axially-spaced arcuate frame assemblies 164 (e.g., the mating structure) which may be mechanically fastened to the barrel skin 122 after determining the optimal clocking orientation 274 of the barrel section 116 for attaching the mating structure 160 using the system 240 and method 300 (FIG. 25) disclosed herein.

Figure 5:
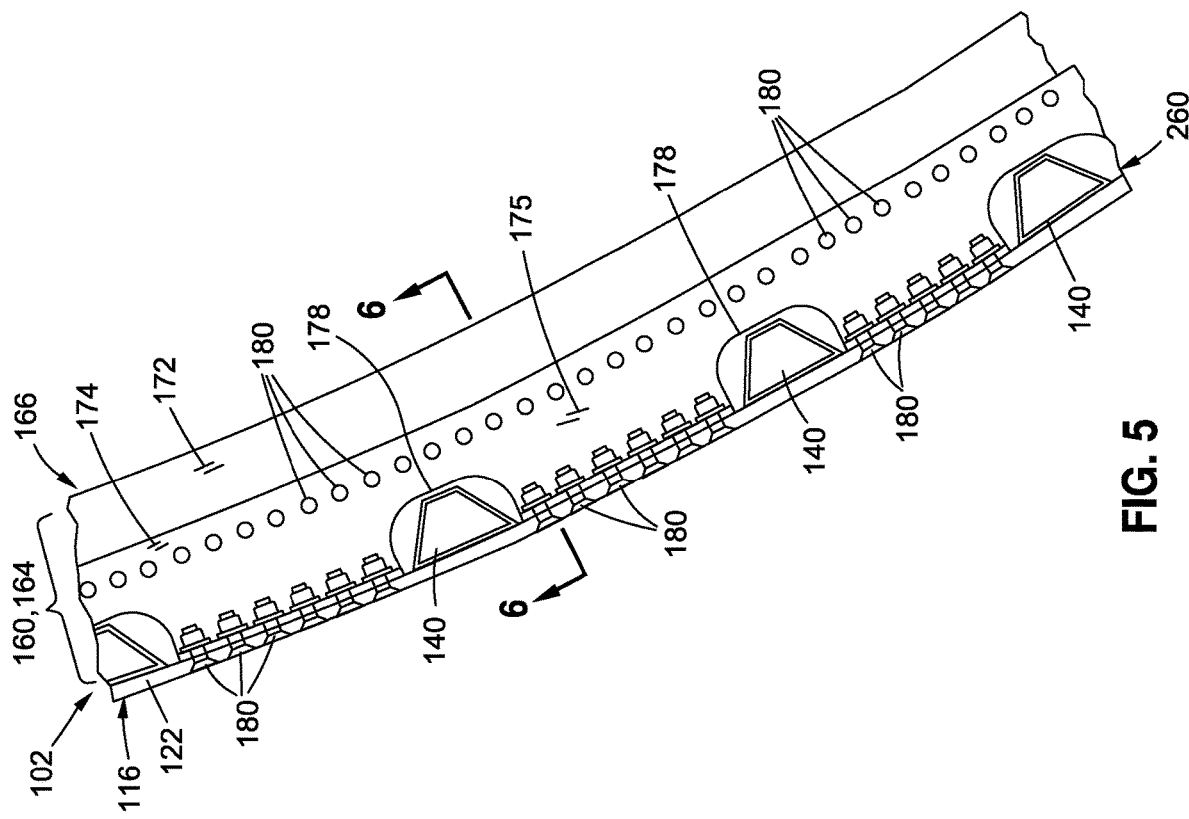
FIG. 5 is a sectional view of the barrel section of FIG. 4 taken along line 5 and illustrating an arcuate frame assembly mechanically fastened to the barrel skin.

FIG. 5 is a sectional view of a portion of an arcuate frame assembly 164 mechanically fastened to the barrel skin 122. Although not shown, each one of the longitudinal stringers 140 may include base flanges with which the arcuate frame assemblies 164 may be placed in direct physical contact when installed in the barrel section 116. In FIG. 5, an arcuate frame assembly 164 is made up of an arcuate structural member 166 mechanically fastened to one or more shear ties 174. The shear ties 174 couple the arcuate structural member 166 to the barrel skin 122. The shear ties 174 may include notches 178 that are sized and configured complementary to the angular spacing between the stringers 140.

Figure 6:
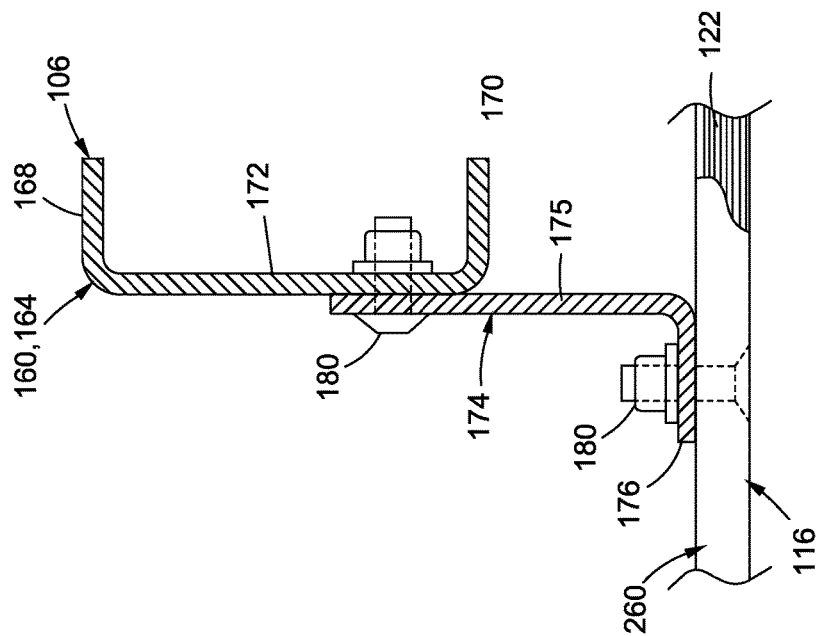
FIG. 6 is a sectional view of the barrel section of FIG. 5 taken along line 6 and illustrating an arcuate frame assembly comprising an arcuate structural member mechanically fastened to a shear tie which is mechanically fastened to the barrel skin.

FIG. 6 is a sectional view showing of the attachment of an arcuate frame assembly 164 to the barrel skin 122. The barrel skin 122 may be formed as a laminate of composite plies as mentioned above. In the example shown, the arcuate structural member 166 has a C-shaped cross section including a radially inner flange 168 and a radial outer flange 170 interconnected by a frame web 172. However, the arcuate structural member 166 may be provided in other cross-sectional shapes including a Z-shaped cross-section, an L-shaped cross-section, or other cross-sectional shapes. Depending upon the location within the barrel section 116, an arcuate structural member 166 may be provided as a circumferential arc segment (e.g., a complete circle of 360 degrees), or the arcuate structural member 166 may be provided as an arc segment of less than 360 degrees. Likewise, a shear tie 174 may be provided as a unitary circular element, or as an arc segment of less than 360 degrees.

Each shear tie 174 may include a shear tie web 175 lying in a radial plane. In addition, each shear tie 174 may include a plurality of shear tie feet 176 separated by the above-mentioned notches 178 which are sized and configured complementary to the size, shape, and angular spacing of the stringers 140. Although shown with an L-shaped cross section, the shear ties 174 may have a C-shaped cross section, a Z-shaped cross-section, or other cross-sectional shapes. The plurality of shear tie feet 176 of each arcuate frame assembly 164 may be described as the mounting locations 182 where the arcuate frame assembly 164 is coupled to the barrel skin 122. In some embodiments, the shear tie feet 176 may be sized and configured to be placed in direct physical contact with the skin inner surface 124.

Figure 10:
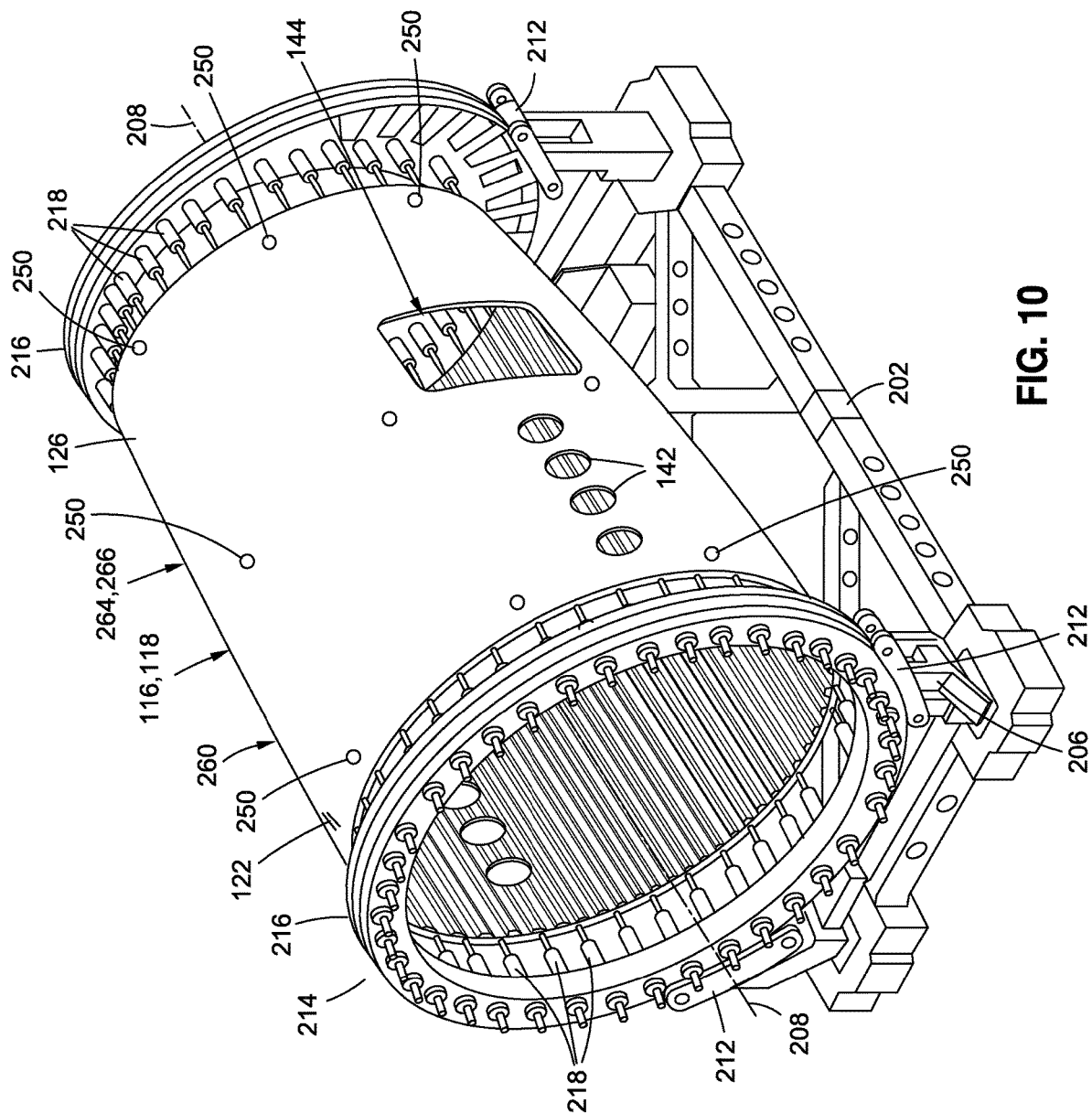
FIG. 10 is a perspective view of the barrel section of FIG. 9 supported on an assembly fixture to enable access to the interior of the barrel section and enabling rotation of the barrel section about a rotational axis, and further illustrating a plurality of radiation devices mounted on the exterior of the barrel skin.

In some examples, one or more of the arcuate frame assemblies 164 of a barrel section 116 may be provided in an as-designed mating structure configuration 162 such that when the arcuate frame assembly 164 is installed in the barrel section 116 at the designated frame station for the arcuate frame assembly 164, all of the shear tie feet 176 of the arcuate frame assembly 164 are in direct, physical, non-gapped relation with the skin inner surface 124. In other examples not shown, the as-designed mating structure configuration 162 of an arcuate frame assembly 164 may be such that when the arcuate frame assembly 164 is installed in the barrel section 116, one or more of the shear tie feet 176 of the arcuate frame assembly 164 are in gapped relation (not shown) with the skin inner surface 124 at preplanned gap locations which may require filling with a shim 194 (not shown) prior to final tightening of the mechanical fasteners 180 coupling the shear tie feet 176 to the barrel skin 122. Prior to final tightening of the mechanical fasteners 180 such as during fit-checking of the arcuate frame assemblies 164, the shear tie feet 176 may be temporarily coupled (e.g., in gapped or non-gapped relation) to the barrel skin 122 using temporary fasteners (e.g., Clecos™—not shown) extended through the pre-existing fastener holes (not shown) in the barrel skin 122 at the designated frame station (e.g., the axial location). In other examples, the arcuate frame assemblies 164 may be held in position for fit-checking at the designated frame station (e.g., the axial location) using hard tooling (not shown) as may be supported on the assembly fixture (FIG. 10).

Figure 7:
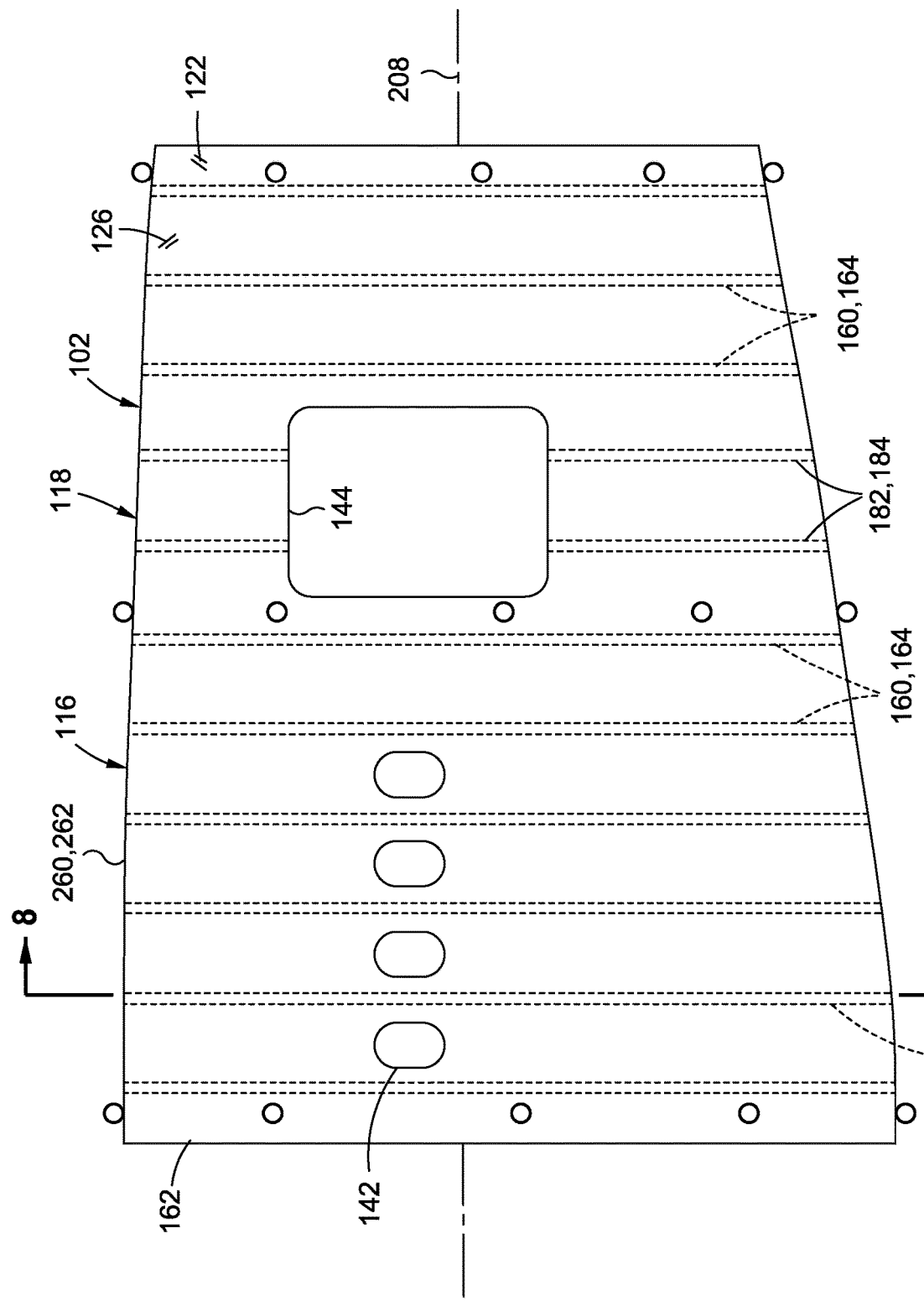
FIG. 7 is a side view of the aft barrel section of FIG. 3 illustrating the axially spaced arcuate frame assemblies installed in the barrel section.

FIG. 7 is a side view of the aft barrel section 118 in an as-designed object configuration 262 illustrating the designated frame stations (e.g., the axial locations 184) of the arcuate frame assemblies 164. The internal stringers 140 are omitted for clarity. Shown are the cutouts including one or more doors 144 and windows 142 that may be formed in the barrel skin 122.

FIG. 8 is a sectional view of the aft barrel section 118 of FIG. 7 illustrating the barrel skin 122 (without stringers 140) in an as-designed object configuration 262 and the mating structure 160 (e.g., the arcuate frame assembly 164) also in an as-designed mating structure configuration 162. The plurality of shear tie feet 176 of the arcuate frame assembly 164 represents the discrete mounting locations 182 where the arcuate frame assembly 164 is attached to the barrel skin 122. Also shown for clocking angle reference in FIG. 8 at the bottom of the barrel section 116 is a phantom line representing a floor beam 114 which is normally horizontal when the barrel section 116 is in an in-service orientation (e.g., when the aircraft 100 is on the ground).

FIGS. 8A-8C are magnified views of three different angular locations 186 on the circumference of the barrel section 116 where the shear tie feet 176 of the arcuate frame assembly 164 in the as-designed configuration are in non-gapped contacting relation with the skin inner surface 124 of the barrel skin 122, which is also in the as-designed configuration. The non-gapped contacting relation between the shear tie feet 176 and the barrel skin 122 obviates the need for installing shims 194 between the shear tie feet 176 and the barrel skin 122. However, in an example not shown, the as-designed configuration of the barrel skin 122 may require the installation of one or more preplanned shims (not shown) between one or more of the shear tie feet 176 and the barrel skin 122.

Figure 9:
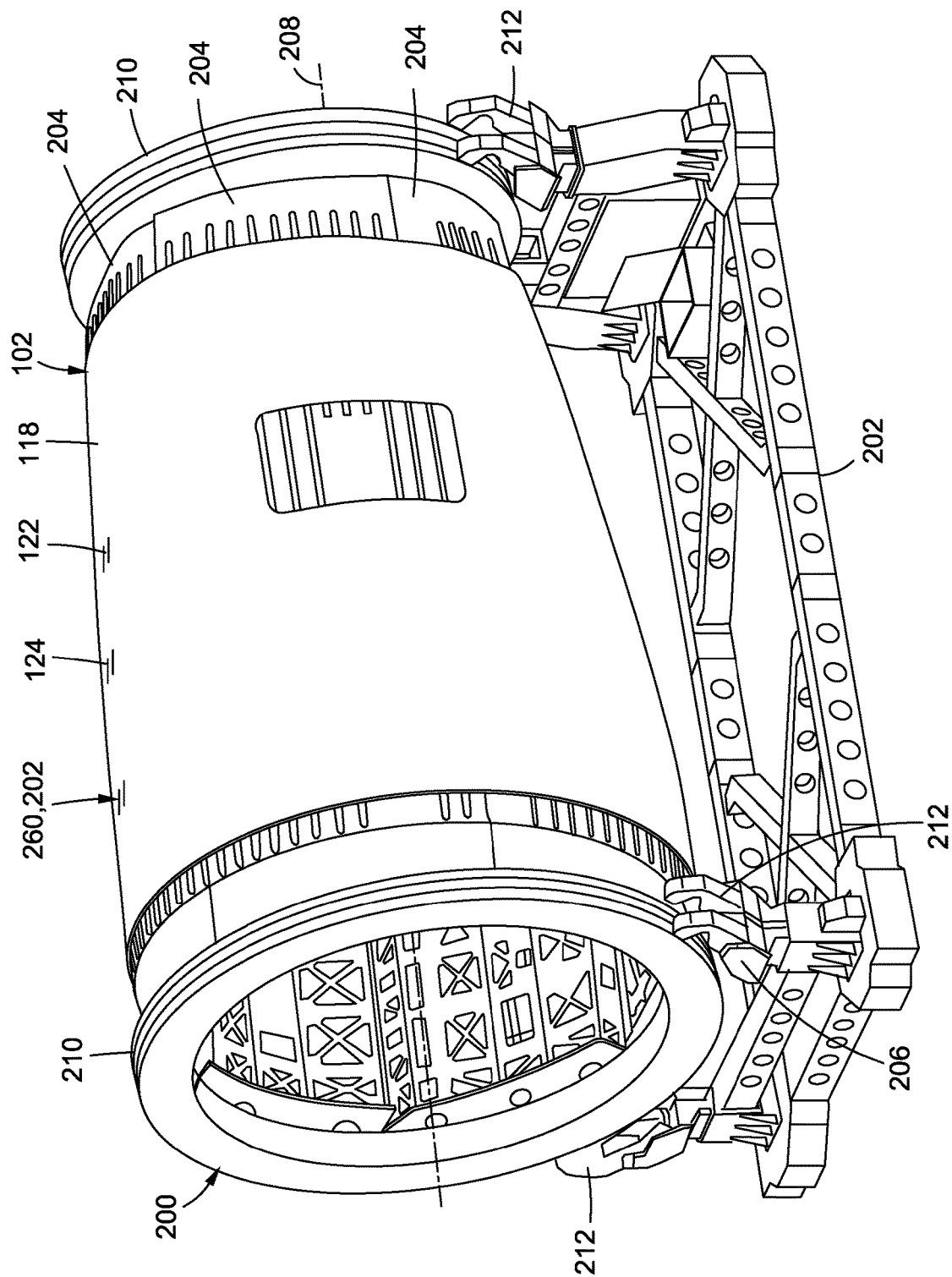
FIG. 9 is a perspective view of a barrel section formed of a plurality of composite plies laid up on a layup mandrel supported by a fabrication fixture.

FIG. 9 shows an example of a fabrication fixture 200 having a rotatable layup mandrel upon which the barrel skin 122 may be laid up and cured in the as-designed object configuration 262. As indicated above, the barrel skin 122 may be formed by laying up a plurality of composite plies over a plurality of uncured or precured composite stringers 140 (FIG. 3) which may be supported on the layup mandrel. As mentioned above, the stringers 140 may be co-bonded or co-cured with the barrel skin 122. The fabrication fixture 200 may include a pair of end rings 210 to which the opposing ends of the mandrel sections 204 may be coupled. The end rings 210 may each be supported by one or more ring cradles 212 which may be rotatably mounted on a fixture base 202. The fabrication fixture 200 may include one or more rotator motors 206 for rotating the layup mandrel during layup of the composite plies to form the barrel skin 122. The fabrication fixture 200 may include a plurality of mandrel sections 204 that may be removed after final cure of the barrel section 116.

FIG. 10 shows the barrel section 116 mounted to an assembly fixture 214 after transferring the barrel section 116 from the fabrication fixture 200 of FIG. 7. With the mandrel sections 204 removed, the interior of the barrel section 116 is accessible to allow for installation of the arcuate frame assemblies 164 and other mating structure 160 such as floor beams 114. In the example shown, the assembly fixture 214 includes a pair of support rings 216 to which the opposing ends of the barrel skin 122 are attached via a plurality of support fittings 218. Similar to the above-described arrangement of the fabrication fixture 200, each one of the support rings 216 may be rotatably supported by one or more ring cradles 212 which may be mounted on the fixture base 202. The assembly fixture 214 may include one or more rotator motors 206 for rotating the barrel skin 122 about a rotational axis 208 when determining the optimal clocking orientation 274 of the barrel section 116 at which to attach mating structure 160.

In FIG. 10, when supported on the fabrication fixture 200, the barrel skin 122 may assume an as-built object configuration 264 that may deviate from the as-designed object configuration 262 due to the barrel skin 122 being unsupported between the opposing ends, and due to the existence of cutouts such as doors 144 and windows 142 in the barrel skin 122. As a consequence, unplanned gaps 190 (e.g., FIG. 14) may occur at multiple mounting locations 182 (e.g., at the shear tie feet 176) between the arcuate frame assemblies 164 and the skin inner surface 124 of the barrel skin 122, as described in greater detail below. Due to the above-mentioned variations in skin thickness resulting in variations in stiffness at different locations of the barrel skin 122, and due to the existence of doors 144 and windows 142 and the potential installation of stiffening structure (e.g., door surrounds) in certain areas of the barrel skin 122, the size and/or quantity of unplanned gaps 190 between the arcuate frame assemblies 164 and the barrel skin 122 may be different at different axial locations 184 (e.g., frame stations) and/or at different angular locations 186 of the barrel skin 122, as described below.

Referring still to FIG. 10, to address the deviations between the as-built object configuration 264 and the as-designed object configuration 262, the presently-disclosed system 240 (FIG. 12) includes a plurality of radiation devices 250 mounted to the object 260 (e.g., the barrel skin 122), a plurality of the above-mentioned transceivers 252 (e.g., FIG. 13), and the processor 278 (e.g., FIG. 13) for determining the optical clocking orientation of the object 260. In the example of FIG. 10, the plurality of radiation devices 250 are mounted on the exterior of the barrel skin 122.

Figure 11:
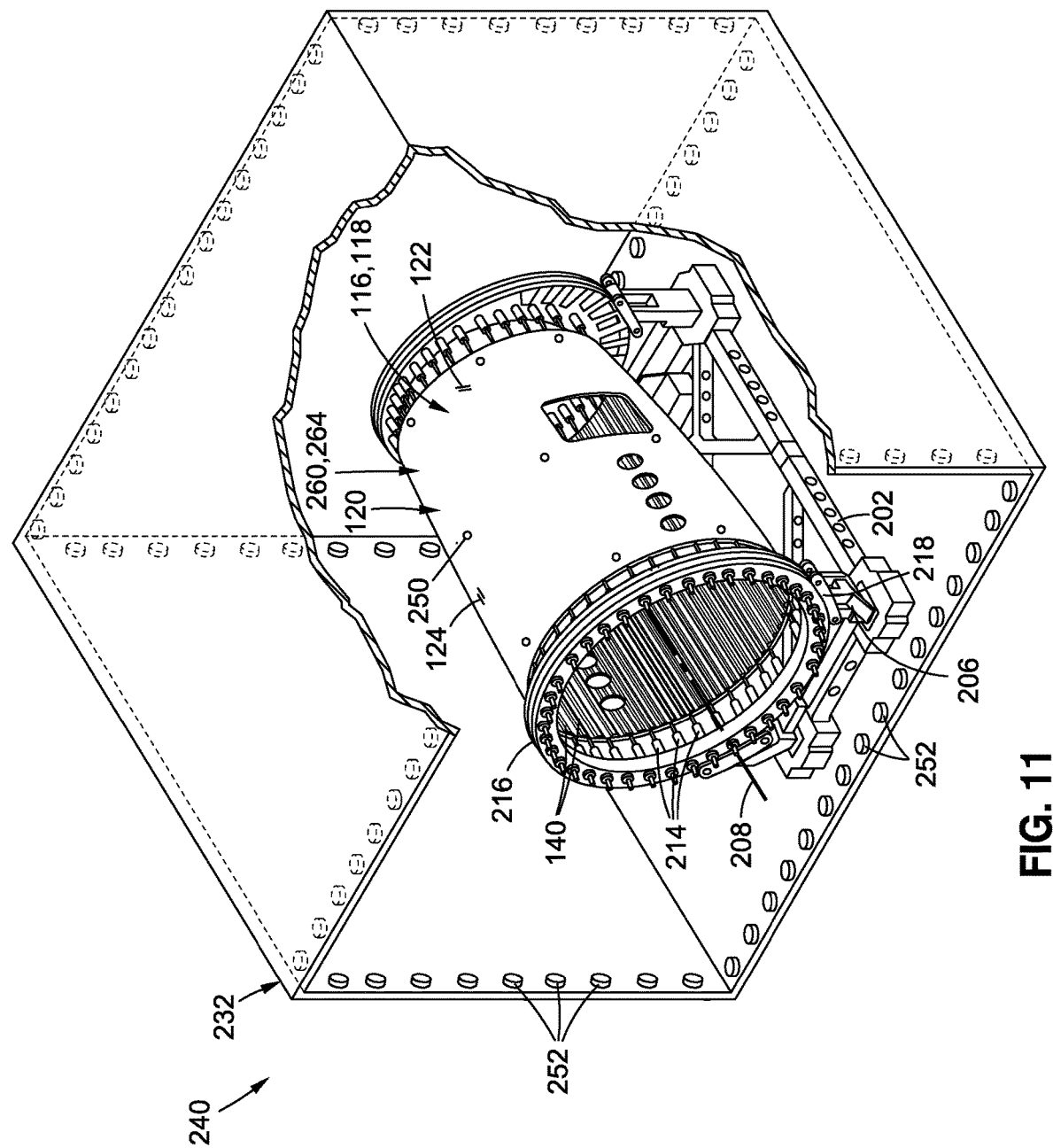
FIG. 11 is a perspective view of the barrel section of FIG. 10 supported on the assembly fixture and surrounded by a plurality of transceivers mounted on an outer support at fixed locations remote from the barrel section.

FIG. 11 shows the barrel section 116 supported on the assembly fixture 214 and surrounded by a plurality of transceivers 252 mounted on an outer support 232 at fixed locations remote from the barrel section 116. As mentioned above, the assembly fixture 214 is configured to support and rotate the barrel section 116 about a rotational axis 208 which, in the example of a barrel section 116, is the longitudinal axis of the barrel section 116. The assembly fixture 214 is configured to rotate the barrel section 116 through at least a portion of one revolution (e.g., 360 degrees) during scanning of the object 260 by the transceivers 252 to determine the optimal clocking orientation 274 for attaching mating structure 160 to the object 260. More preferably, the assembly fixture 214 is configured to rotate the barrel section 116 through at least one complete revolution.

In the example of FIG. 11, the outer support 232 includes a bottom member, a pair of opposing side members, and a top member. In an embodiment, the members may be the floor, walls, and ceiling of a scanning chamber (not shown). Alternatively, the outer support 232 may be a frame or a fixture (not shown) configured to support at least a portion of the transceivers 252. In a still further embodiment, the outer support 232 may be configured to support the transceivers 252 in one or more circular arrays (not shown) surrounding the object 260. Regardless of the specific configuration, the outer support 232 is preferably configured to fixedly support a plurality of transceivers 252 on one or more sides of the object 260 such that at least one or more of the radiation devices 250 is within the radiative field of view of at least one transceiver 252 during rotation of the barrel section 116.

Figure 12:
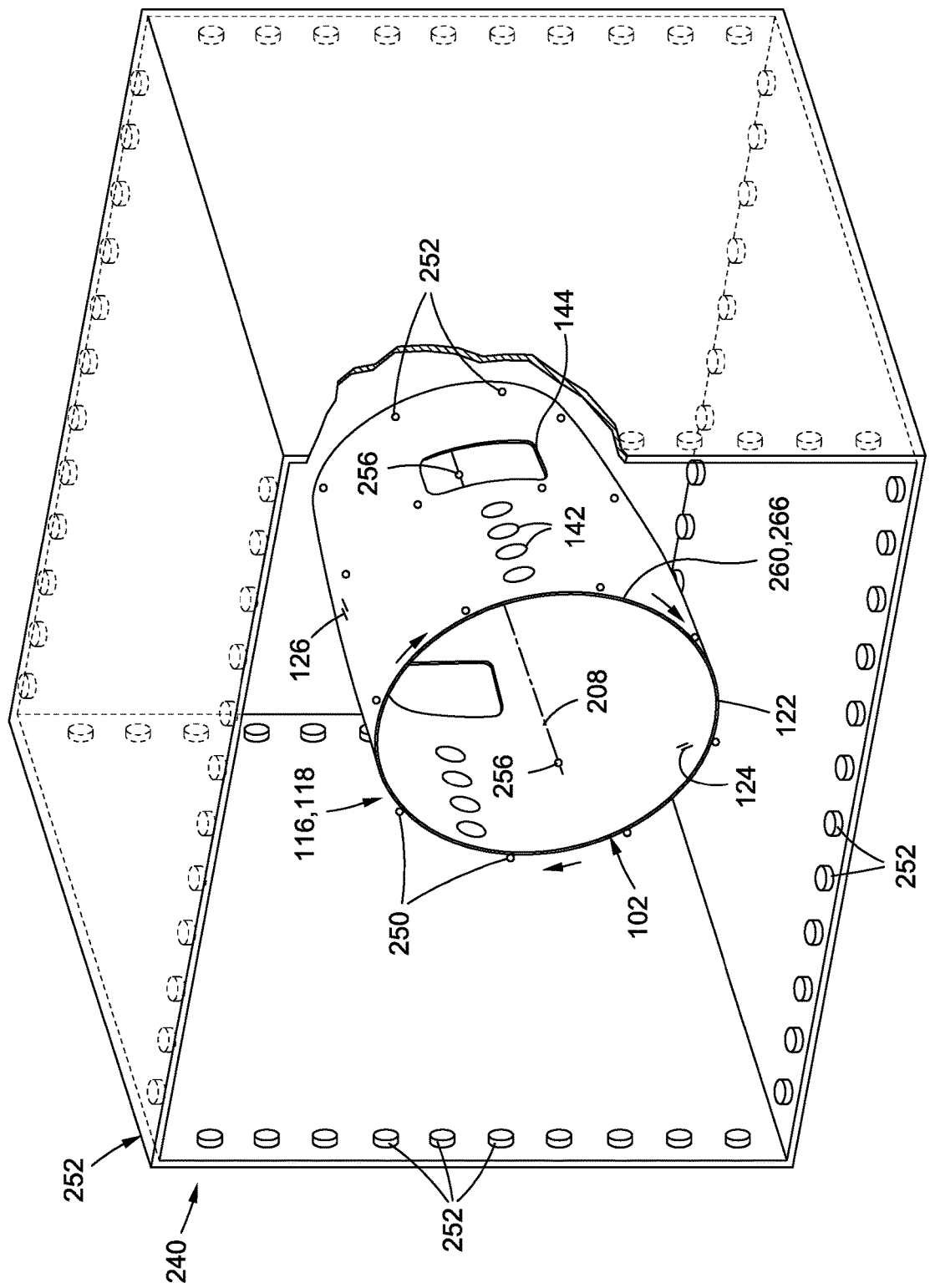
FIG. 12 is a simplified perspective view of a barrel skin of the barrel section of FIG. 11 illustrating the radiation devices mounted on the barrel skin and the transceivers mounted on the outer support.

FIG. 12 is a simplified view of the barrel section 116 of FIG. 11 with the stringers 140 omitted and showing only the barrel skin 122. The transceivers 252 are located radially outboard of an outermost radius of rotation of the object 260. For example, the transceivers 252 may be mounted on a wall, a floor, and a ceiling of a manufacturing area or enclosure as mentioned above. An outermost radius of rotation of the object 260 may be described as the largest radius traced by a portion of the object 260 during rotation about the rotational axis 208. Although not shown in FIG. 12, opposing ends of the barrel skin 122 may be supported by the assembly fixture 214 (FIG. 11) which may include a rotator motor 206 for rotating the barrel section 116 about the rotational axis 208.

FIG. 12 shows the radiation devices 250 mounted to the barrel section 116 (e.g., the object) on a radially outboard side of the barrel section 116. For example, each one of the opposing ends of the barrel section 116 may include radiation devices 250 mounted at angularly spaced intervals around the circumference of the barrel section 116. In FIG. 12, each end of the barrel section 116 includes eight (8) radiation devices 250 arranged in equiangularly spaced relation around the circumference of the barrel section 116. In addition, the barrel section 116 includes radiation devices 250 mounted midway between the radiation devices 250 on the opposing ends of the barrel section 116. However, an object 260 (e.g., the barrel section) may include any number of radiation devices 250 mounted at a variety of locations. Preferably, the object 260 (e.g., the barrel section) includes a minimum of two radiation devices 250 mounted in angularly spaced relation to one another (e.g., diametrically opposed) to allow for the determination of the as-built object configuration 264 and corresponding optimal clocking orientation 274 that results in the smallest deviation of the as-built object configuration 264 from the as-designed object configuration 262, as described in greater detail below.

The radiation devices 250 may be mounted on, attached to, embedded in, or otherwise affixed to the barrel skin 122. For example, one or more of the radiation devices 250 may be mounted on the skin outer surface 126. In a further example, one or more of the radiation devices 250 may be mounted to pre-existing fastener holes or tooling holes (not shown) formed in the barrel skin 122. For example, one or more of the radiation devices 250 may include a threaded stud (not shown) that may be extended through a pre-existing hole in the barrel skin 122 and secured to the barrel skin 122 with a nut (not shown). In an embodiment not shown, one or more of radiation device 250 may be housed within a radiation-transparent housing (not shown) for protection from the elements of the manufacturing environment.

One or more of the radiation devices 250 may be passive radiation devices 250. Alternatively or additionally, one or more of the radiation devices 250 may be active radiation devices 250. Passive radiation devices 250 are configured to reflect transceiver 252 radiation back toward the transceivers 252, and may not emit radiation. In one example, passive radiation devices 250 may be spherically or semi-spherically shaped members having a highly reflective surface such as a mirror surface for reflecting radiation back toward the transceivers 252. Passive radiation devices may be formed of any material including metallic material and/or nonmetallic material. Active radiation devices 250 may emit radiation toward the transceivers 252 in response to being activated by radiation 254 from the transceivers 252. In one example, active radiation devices 250 may include photo diodes or other technology for detecting the radiation 254 (e.g., laser light) emitted by the transceivers 252, and may further include an emitter for emitting radiation back toward the transceivers 252 once the radiation device 250 detects radiation 254 from the transceivers 252.

Figure 13:
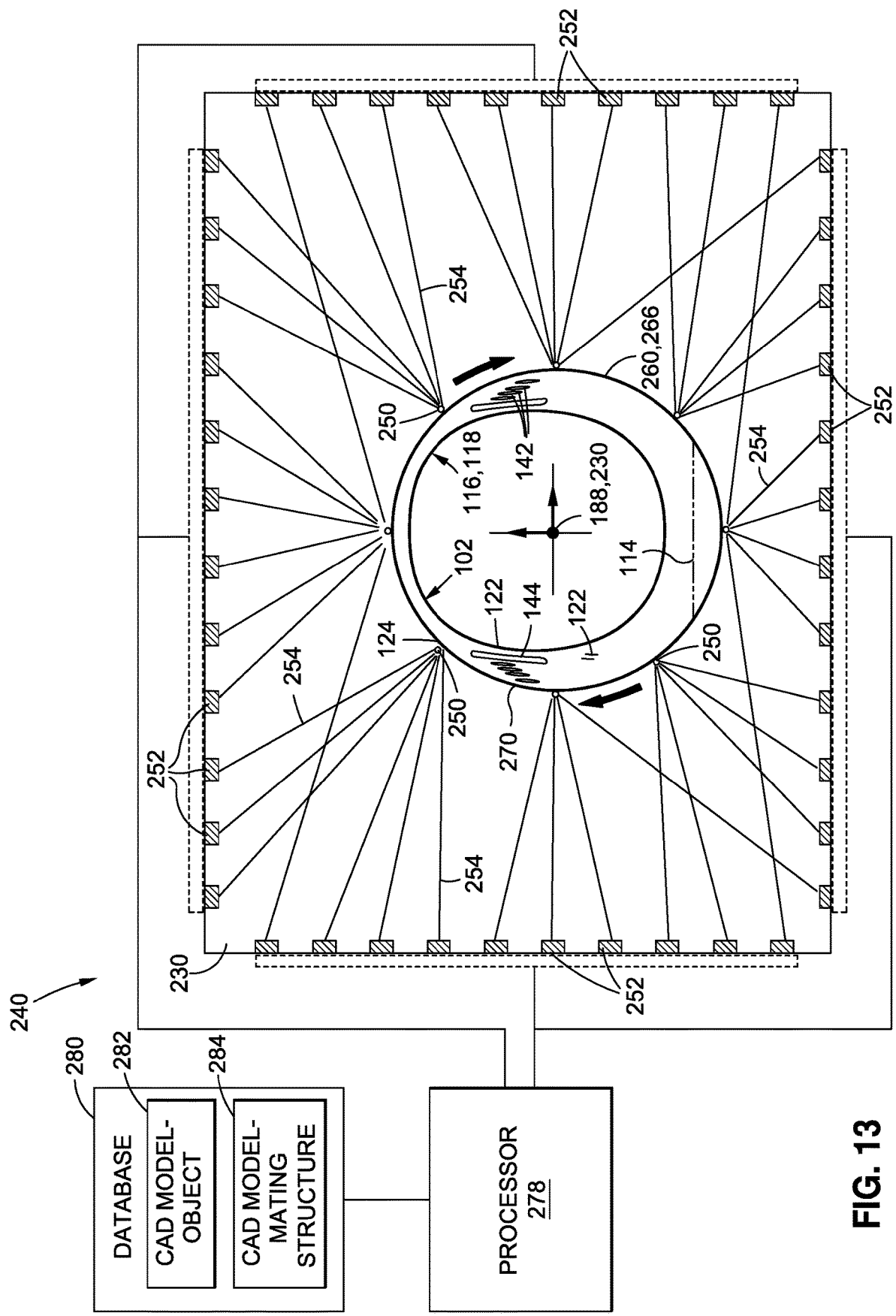
FIG. 13 is a front view of the barrel skin of FIG. 12 in a first clocking orientation prior to rotation about a rotational axis, and illustrating radiation emitted by the transceivers and reflected by the radiation devices back toward the transceivers.

FIG. 13 is a front view of the barrel skin 122 of FIG. 12 in a first clocking orientation 270 prior to rotation about the rotational axis 208. The transceivers 252 are mounted at fixed locations remote from the barrel section 116 (e.g., the object), as mentioned above. The transceivers 252 are configured to continuously emit radiation 254 toward the radiation devices 250 during rotation of the barrel section 116, and receive radiation 254 reflected or emitted by the radiation devices 250. Radiation 254 emitted by the transceivers 252 and optionally emitted by active radiation devices 250 may be in the infrared spectrum, the visual spectrum, the ultraviolet spectrum, or in other spectrums including the radio spectrum such as in the microwave spectrum. Radiation 254 emitted by the transceivers 252 may also be in the x-ray spectrum, as described in greater detail below. The transceivers 252 may omnidirectionally emit radiation 254 toward the radiation devices 250, and receive radiation 254 (e.g., emitted or reflected) from the radiation devices 250. Although FIG. 13 illustrates all of the transceivers 252 emitting and receiving radiation 254 during rotation of the object 260, the system 240 may be configured such that less than all of the transceivers 252 emit radiation 254 during rotation of the object 260. For example, for an object 260 having an open cross-section (e.g., FIG. 24), some of the transceivers 252 may only emit radiation 254 during rotation of the object 260 through a first sweep angle (e.g., from 0-180 degrees), and other transceivers 252 may only emit radiation 254 during rotation of the object 260 through a second sweep angle (e.g., from 180-360 degrees).

One or more of the transceivers 252 may be configured as a laser transceiver (e.g., a laser scanner) configured to emit a laser beam that is scanned through a scan angle (not shown). The scanning of the laser beam through the scan angle may be performed by using a rotating mirror (not shown) in the laser transceiver to generate a laser plane (not shown) that is projected onto the object 260 and radiation devices 250. Simultaneously, the laser transceiver may continuously pivot the laser plane back and forth through a sweep angle (not shown) to effectively provide omnidirectional (e.g., three-dimensional) scanning of the barrel section 116 during rotation about a single rotational axis 208 or about multiple rotational axes (not shown) as mentioned above.

In another example, one or more the transceivers 252 may be a light-emitting-diode (LED) transceiver operated as a time-of-flight laser scanner using light-emitting-diode detection and ranging (LEDDAR) technology. An LED transceiver may continuously emit short pulses of light toward the radiation devices 250 as the barrel section 116 rotates. The LED transceiver may include a sensor to receive light reflected by the radiation devices 250, allowing the LED transceiver to continuously generate distance measurements that are continuously transmitted to the processor 278. In a further embodiment, one or more of the laser transceivers may be configured as a triangulation laser scanner having a transmitter (not shown), appropriate optics (not shown), and a receiver (not shown). Using known values of the angle at which the laser beam is emitted by the laser scanner, and using known values of the distance between the transmitter and receiver, the angle at which the reflected light is received at the receiver can be determined by measuring the location on the receiver where the reflected light is received. Distance measurements between the laser scanner and the radiation devices 250 on the rotating barrel section 116 can be determined by triangulating the angle and distance values. As mentioned above, during rotation of the object 260 about the rotational axis 208, each radiation device 250 is preferably within the field of view of at least one of the transceivers 252 to allow the transceivers 252 to continuously generate distance measurements between the transceivers 252 and the radiation device 250 regardless of the instantaneous clocking orientation of the barrel section 116.

In a still further example, one or more of the transceivers 252 may be provided as radiative transceivers which, in the present disclosure, may be described as transceivers configured to omnidirectionally emit radio waves, as opposed to emitting radiation in the form of ultraviolet, visible, and/or infrared light. For example, one or more radiative transceivers may omnidirectionally emit radiative energy in one or more frequencies outside of the ultraviolet, visible, and/or infrared spectrum. Such radiative transceivers may be configured or tuned to emit radiation at one or more frequencies that can pass through the material (e.g., composite material such as carbon-fiber reinforced polymeric material) of the object 260. Radiation emitted by such radiative transceivers may include, but is not limited to, radio waves, microwaves, and x-rays. Radiative transceivers may obviate the need to position the transceivers within optical (e.g., visible) line of sight of the radiation devices 250 as may be required with laser transceivers, light-emitting-diode transceivers, or other transceivers that emit radiation in the ultraviolet, visible, and/or infrared spectrum.

By configuring the transceivers 252 to emit radio waves of a frequency that at least partially pass through the object 260 and are not completely obstructed, blocked, or reflected by the object 260, the radiation devices may be located on a side of the object 260 opposite the transceivers 252. For example, in an arrangement where radiative transceivers 252 are located radially outboard of the barrel section 118 (FIG. 12), instead of mounting the radiation devices 250 to the skin outer surface 126 of the barrel skin 122 and within optical line-of-sight of the transceivers 252, the radiation devices 250 may be mounted to the skin inner surface 124 which may advantageously reduce or eliminate inaccuracies otherwise occurring in distance measurements generated by skin-outer-surface-mounted radiation devices 250 due to tolerance stackup (e.g., in the ply thicknesses) of the manufactured barrel skin, relative to the design thickness of the barrel skin as represented in the CAD model 282 (FIG. 13) of the barrel section 118. Conversely, in some examples, it may be desirable to locate the radiative transceivers radially inboard of the barrel section 118 (FIG. 12) and mount the radiation devices 250 on the skin outer surface 124.

Referring still to FIG. 13, prior to rotating the barrel section 116 (e.g., the object) about the rotational axis 208 to determine the optimal clocking orientation 274, each transceiver 252 may be initially calibrated using an independent distance measurement system (not shown) such as a laser tracker or other distance measurement system preferably having a level of accuracy that is higher than the distance-measuring accuracy of the transceivers 252. In addition, prior to rotating the barrel section 116, the offset distance (not shown) may be established between each radiation device 250 and the barrel section 116 surface for which the as-designed object configuration 262 is to be determined. For example, if the optimal clocking orientation 274 of the barrel section 116 is being determined for when the as-designed object configuration 262 (e.g., contour) of the skin inner surface 124 has the smallest deviation from the as-built object configuration 264 (e.g., contour) of the skin inner surface 124, then the offset distance between each radiation device 250 and the skin inner surface 124 may be initially measured and stored in the processor 278 to allow the processor 278 to account for such offset distance when continuously determining the changing as-designed object configuration 262 of the skin inner surface 124 during rotation of the barrel section 116.

In addition, prior to rotating the barrel section 116 (e.g., the object) about one or more rotational axes (e.g., the rotational axis 208) and after the initial calibration of the transceivers 252, the transceivers 252 may emit radiation 254 to generate distance measurements for transmission to the processor 278 for determining whether the barrel section 116 potentially has a first as-built object configuration 266 (FIG. 14) that differs from the as-designed object configuration 262. The first as-built object configuration 266 corresponds to a first clocking orientation 270 (FIG. 14) of the barrel section 116, and which may be described as a clocking angle of 0 degrees relative to a reference coordinate system 230 (RCS) fixedly located on the rotational axis 208 of the object 260.

In FIG. 13, the processor 278 is communicatively coupled to the transceivers 252, and is configured to continuously receive distance measurements generated by the transceivers 252 during rotation of the barrel section 116 about the rotational axis 208. In some examples, the barrel section 116 may be rotated through a portion of a 360-degree revolution, or through at least one complete 360-degree revolution to enable the processor 278 to identify one or more optimal clocking orientations 274. The processor 278 continuously receives the distance measurements generated by the transceivers 252 during continuous rotation of the barrel section 116, and processes the distance measurements to determine at least one optimal clocking orientation 274 at which the as-built object configuration 264 of the barrel section 116 has the smallest deviation from the as-designed object configuration 262 of the barrel section 116. As mentioned above, the processor 278 may be configured to account for the offset distance between each radiation device 250 and the surface (e.g., the skin inner surface 124 of the barrel section) for which the as-designed object configuration 262 is being determined.

Figure 19:
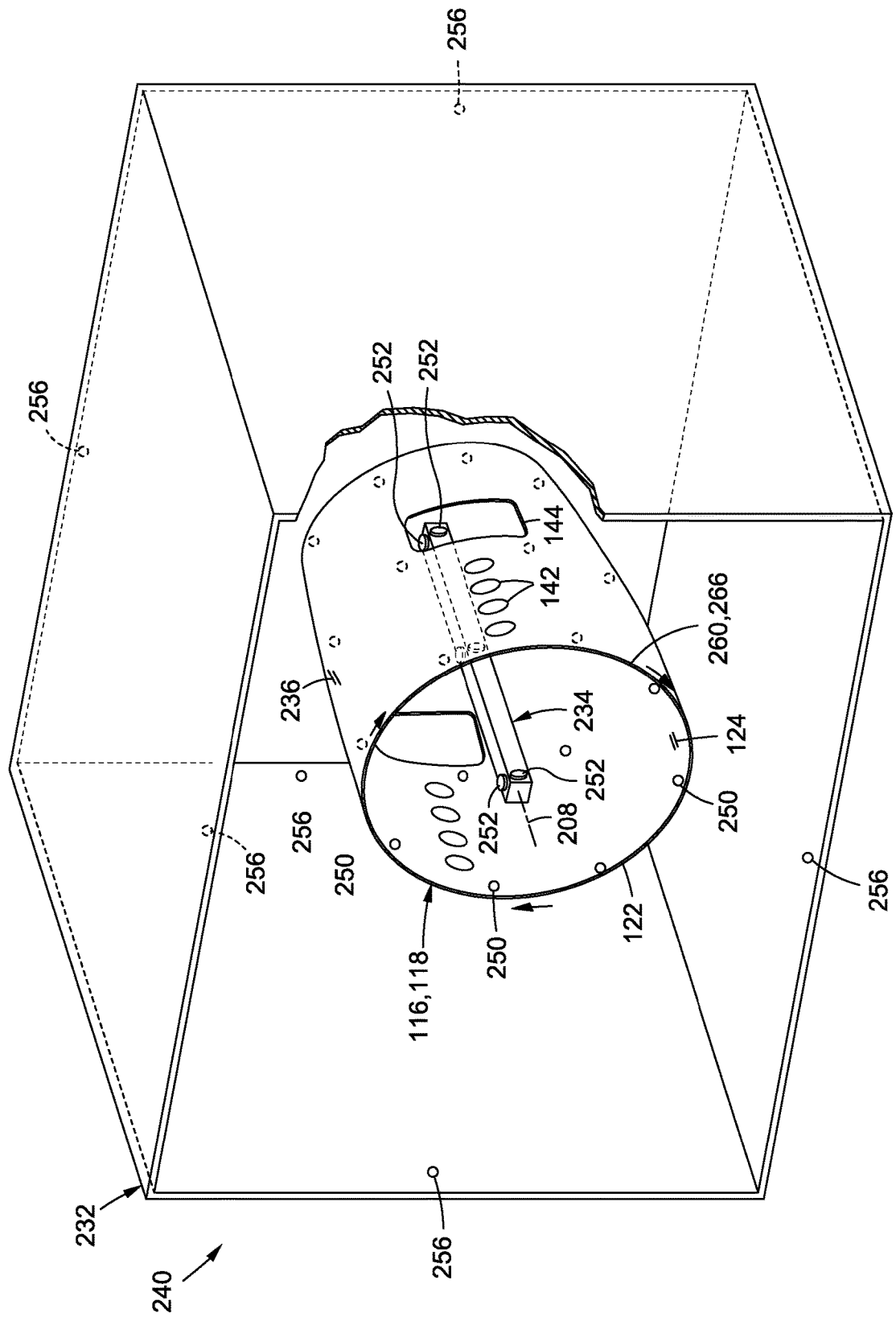
FIG. 19 is a perspective view of a barrel skin with a plurality of radiation devices mounted on the interior of the barrel skin and a plurality of transceivers mounted on an inner support.

In addition to calibrating the transceivers 252 prior to rotation of the object 260, the processor 278 may also be configured to calibrate the transceivers 252 in real time during rotation of the object 260 using one or more calibration targets 256 (FIG. 12). A calibration target 256 may comprise an radiation device 250 or other calibration target 256. In one example, the calibration target 256 may be non-movably mounted on the assembly fixture 214 (FIG. 11) in a location that is within the line of sight of the transceivers 252. For example, a calibration target 256 may be provided as a reflective spherical member fixedly mounted on the assembly fixture 214 at a location beyond a circumferential end of the barrel section 116 and coincident with the rotational axis 208. In addition, the spherical member may be mounted at a location that is within the line of sight of the array of the transceivers 252 mounted on the floor, walls, and ceiling (e.g., the outer support 232) shown in FIG. 12. In another example, one or more calibration targets 256 may be fixedly mounted on the outer support 232 (FIG. 19).

Real-time calibration of the transceivers 252 may be performed by determining an initial distance measurement from each transceiver 252 to the calibration target 256 prior to rotating the object 260 about the rotational axis 208. The initial distance measurement may be determined by an independent distance measuring system (not shown). The initial distance measurement for each transceiver 252 may be transmitted to the processor 278 for storage in the database 280. During rotation of the object 260, each transceivers 252 may continuously generate subsequent distance measurements to the calibration target 256 for calibrating the transceiver 252. The subsequent distance measurements to the calibration target 256 during object 260 rotation may be continuously transmitted to the processor 278.

For each transceiver 252, the processor 278 may continuously compare the subsequent distance measurements to the initial distance measurement and, based on the comparison, determine whether the transceiver 252 is out of tolerance. During object rotation, if the processor 278 determines that any of the transceivers 252 are out of tolerance, the processor 278 compensates for distance measurements to radiation devices 250 generated by any out-of-tolerance transceivers 252. For example, to compensate for distance measurements made by an out-of-tolerance transceiver 252, the processor 278 may adjust the distance measurements generated by an out-of-tolerance transceiver 252. Alternatively or additionally, the processor 278 may compensate for distance measurements made by an out-of-tolerance transceiver 252 by adjusting the power level of the transceiver 252 and/or by adjusting the characteristics of the radiation 254 (e.g., frequency and/or wavelength) emitted by the transceiver 252.

Referring still to FIG. 13, the processor 278 may include and/or may be a computer, a programmable logic controller, or other processing device configured to communicate via hardwire or wirelessly (e.g., via RFID) with the transceivers 252, and continuously receive distance measurements from the transceivers 252 before and during rotation of the object 260 (e.g., barrel section). The processor 278 may include or may be communicatively coupled to a database 280 containing a computer aided design (CAD) model 282 of the object 260 (e.g., the barrel section) representing the as-designed object configuration 262. In addition, the database 280 may contain a CAD model 284 of the mating structure 160 (e.g., the arcuate frame assemblies 164) representing the as-designed mating structure configuration 162. In some examples, the database 280 may contain a mating structure CAD model that has been adjusted to reflect the actual dimensions determined during inspection of an existing mating structure 160 to be attached to the object 260 in an as-built mating structure 160 configuration, and which may differ slightly from the as-designed mating structure configuration 162. In an embodiment, the processor 278 may be configured to continuously compare the as-built object configuration 264 to the as-designed mating structure configuration 162 at locations where the object 260 and mating structure 160 interface with one another to determine an optimal clocking orientation 274 that minimizes mismatch or gaps 190 at the interfaces between the object 260 and the mating structure 160.

In some examples, the processor 278 may be configured to control the rotator motor 206 (FIG. 10) to initiate, maintain, and stop the rotation of the object 260. For example, the processor 278 may control the rotator motor 206 of the assembly fixture 214 during rotation of the object 260 to determine the optimal clocking orientation 274. Alternatively, rotation of the object 260 may be controlled independent of the processor 278. As mentioned above, the processor 278 may continuously receive data representative of the clocking angle of the object 260 from a rotary encoder (not shown) or other angle measuring device.

When receiving continuous distance measurements and clocking angle data, the processor 278 continuously determines as-built object configurations 264 corresponding to the clocking orientation for which the distance measurements are being received. During rotation of the object 260, the processor 278 continuously compares additional unique as-built object configurations 264 to the as-designed object configuration 262, which is represented by the CAD model 282 of the object 260. The processor 278 continuously records a time-history of the deviation of the as-built object configuration 264 from the as-designed object configuration 262, in addition to recording the clocking orientation. After completion of the rotation of the object 260, preferably through at least one complete revolution, the processor 278 queries the recorded time-history of deviations and corresponding clocking orientation to determine at least one optimal clocking orientation 274 at which the object 260 has the smallest deviation between the as-built object configuration 264 and the as-designed object configuration 262. After determining the optimal clocking orientation 274, the processor 278 may command the rotator motor 206 to rotate the assembly fixture 214 to the optimal clocking orientation 274 to allow for installation of the mating structure 160 (e.g., the arcuate frame assemblies 164).

Referring still to FIG. 13, the processor 278 may theoretically determine an infinite number of as-built object configurations 264 corresponding to an infinite number of unique clocking orientations based on continuous distance measurements generated by the transceivers 252 during rotation of the object 260 about rotational axis 208. In some examples, the quantity of unique clocking orientations for which the processor 278 determines the as-built object configurations 264 may be dependent upon the bandwidth or frequency with which the transceivers 252 determine distance measurements, relative to the rate of rotation of the object 260. Alternatively or additionally, the quantity of unique clocking orientations for which the processor 278 determines as-built object configurations 264 may be dependent upon the rate at which the processor 278 receives, samples, and/or processes the distance measurements. However, the processor 278 may be programmed to infer or extrapolate as-built object configurations 264 corresponding to clocking orientations that are located between the clocking orientations for which distance measurements have been generated. For example, the processor 278 may determine an as-built object configuration 264 for a desired clocking orientation by using the average of the distance measurements generated for the clocking orientations on opposite sides of the desired clocking orientation (i.e., the clocking orientation before and the clocking orientation after the desired clocking orientation).

In some examples, the system 240 may be configured such that the processor 278, after determining at least one optimal clocking orientation 274 of the object 260, additionally identifies the axial location 184 (e.g., the frame station) for which the deviation between the as-built object configuration 264 and the as-designed object configuration 262 is the smallest. As indicated earlier, the object 260 may have different stiffnesses at different locations, such that the magnitude of the deviation at one axial location 184 of the object 260 may be different than the magnitude of the deviation at another axial location 184 of the object 260. In this regard, the processor 278 may be configured determine a first optimal clocking orientation 274 (not shown) for the object 260 where the deviation of the as-built object configuration 264 from the as-designed object configuration 262 is the smallest along a first axial section (not shown) of the object 260, and one or more additional optimal clocking orientations 274 (not shown) where the deviation is the smallest along an additional axial section different than the first axial section of the object 260.

Even further, after determining at least one optimal clocking orientation 274 of the object 260 where the deviation between the as-built object configuration 264 and the as-designed object configuration 262 is the smallest, the processor 278 may be configured to identify (for that optimal clocking orientation) the angular location at which the deviation is at a maximum. The angular location may be defined in terms of an object coordinate system 188 (OCS) that rotates with the object 260. Still further, after determining an optimal clocking orientation 274 of the object 260, the processor 278 may compare the as-built object configuration 264 to the CAD model 284 of the mating structure 160 for each axial location 184 (e.g., frame station), and determine the specific angular locations 186 on the mating structure 160 where shims 194 are required. For example, after determining an optimal clocking orientation 274 for installing all of the arcuate frame assemblies 164 in a barrel section 116, the processor 278 may additionally identify specific angular locations 186 on each arcuate frame assembly 164 where shims 194 are required between the shear tie feet 176 and the skin inner surface 124 of the barrel skin 122. Even further, the processor 278 may compare the as-built object configuration 264 to the CAD model 284 of the mating structure 160, (e.g., the arcuate frame assemblies 164) and identify the dimensions of each shim 194 such as the shim thickness.

FIG. 14 is a schematic diagram of the barrel skin 122 of FIGS. 12-13 shown in solid lines in a first as-built object configuration 266 corresponding to the first clocking orientation 270. Also shown in phantom lines is the as-designed object configuration 262 of the barrel skin 122. In addition, shown are locations of deviation 192 around the circumference of the barrel skin 122 where the first as-built object configuration 266 of the barrel skin 122 deviates from the as-designed object configuration 262 of the barrel skin 122 shown in phantom lines. As indicated above, the first clocking orientation 270 may be described as a clocking angle of 0 degrees relative to a reference coordinate system 230 (RCS) fixedly located on the rotational axis 208.

FIG. 15 is a sectional view of the barrel section 116 in the first as-built object configuration 266 of the barrel skin 122 of FIG. 13 corresponding to the first clocking orientation 270. Also shown is an arcuate (e.g., circumferential) frame assembly 164 (e.g., mating structure) in the as-designed mating structure configuration 162 prior to final attachment to the barrel skin 122 to illustrate gaps 190 that may exist between the arcuate frame assembly 164 and the skin inner surface 124 at the deviation 192 locations. FIGS. 15A-15C are each magnified views of portions of the deviation 192 locations indicated in FIG. 15, and illustrate locations where out-of-tolerance gaps 190 exist between the arcuate frame assembly 164 in the as-designed mating structure configuration 162 and the barrel skin 122 in the first as-built object configuration 266. The contour of the mating surface of the shear tie feet 176 of the arcuate frame assemblies 164 in the as-designed mating structure configuration 162 may be equivalent to the contour of the skin inner surface 124 of the barrel skin 122 in the as-designed mating structure configuration 162.

In FIG. 15A, shown are gaps 190 between the shear tie feet 176 and the skin inner surface 124 of the barrel skin 122. The gaps may be out-of-tolerance gaps 190 requiring the fabrication and installation of shims 194 which are shown in phantom. Depending upon the thickness, shims 194 may be relatively easily manufactured from metallic or non-metallic peel-ply laminated shim stock (not shown). FIG. 15B illustrates out-of-tolerance gaps 190 between the shear tie feet 176 and skin inner surface 124 which are larger than the out-of-tolerance gaps 190 shown in FIG. 15A, and which may necessitate stress analysis to determine the ability to shim the relatively large gaps 190, and may require custom manufacturing of relatively thick shims from a solid piece of metallic shim stock (not shown). FIG. 15C illustrates out-of-tolerance gaps 190 that may be similar in size to the out-of-tolerance gaps 190 of FIG. 15A.

Figure 16:
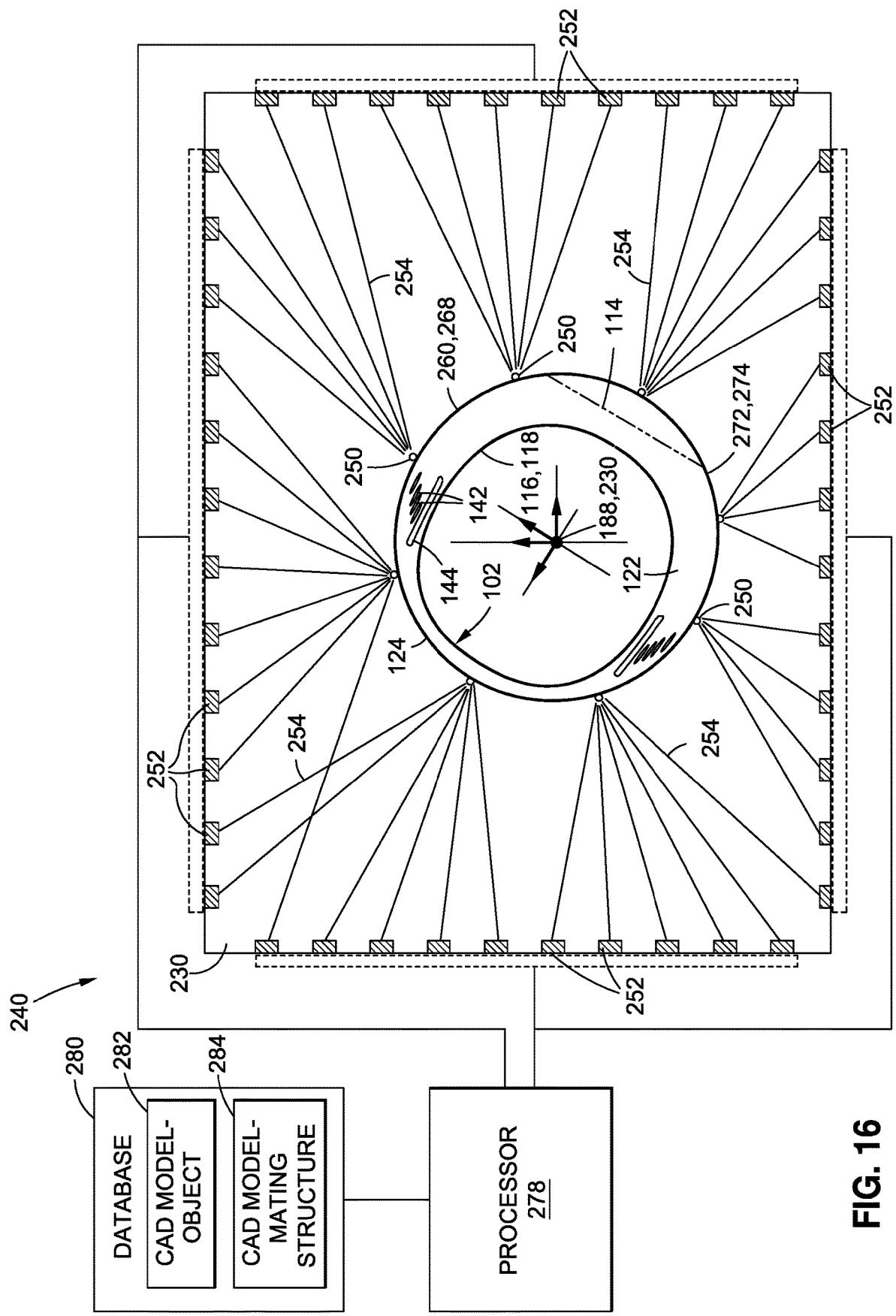
FIG. 16 is a front view of the barrel skin in an additional clocking orientation different than the first clocking orientation of FIG. 13, and wherein the additional clocking orientation is the optimal clocking orientation for the barrel section.

FIG. 16 is a front view of the barrel skin 122 of FIG. 12 in an additional clocking orientation 272 that is different than the first clocking orientation 270. As mentioned above, the clocking orientation may be described in terms of a clocking angle relative to the reference coordinate system 230 (RCS) fixedly located on the rotational axis 208 of the object 260. As described below, the additional clocking orientation 272 of the barrel section 116 shown in FIG. 16 is determined by the processor 278 as the clocking orientation that results in the smallest deviation of the as-built object configuration 264 of the barrel section 116 from the as-designed object configuration 262, and therefore represents the optimal clocking orientation 274 of the barrel section 116.

FIG. 17 is a schematic diagram of the barrel skin 122 shown in solid lines in the additional as-built object configuration 268 corresponding to the additional clocking orientation 272 of FIG. 16. Also shown in phantom lines is the as-designed object configuration 262 of the barrel skin 122 to illustrate a single deviation 192 location where the additional as-built object configuration 268 of the barrel skin 122 deviates from the as-designed object configuration 262 of the barrel skin 122. As mentioned above, during rotation of the object 260, the processor 278 continuously compares the first and additional as-built object configurations 266, 268 to the as-designed object configuration 262 and, after completion of the rotation of the object 260, determines the optimal clocking orientation 274 at which the as-built object configuration 264 has the smallest deviation from the as-designed object configuration 262. In the present example, FIG. 17 illustrates the optimal clocking orientation 274 of the barrel section 116 as determined by the processor 278 preferably after at least one complete revolution of the barrel section 116.

The determination of the smallest deviation of the as-built object configuration 264 from the as-designed object configuration 262 may include determining the optimal clocking orientation 274 that reduces gaps 190 between the object 260 and the mating structure 160 at one or more discrete mounting locations 182 with the mating structure 160 in the as-designed mating structure configuration 162. The mating structure 160 in the as-designed mating structure configuration 162 may be complementary to the object 260 in the as-designed object configuration 262. For example, the contour of the shear tie feet 176 (e.g., the mating structure) in the as-designed mating structure configuration 162 may be equivalent to the contour of the skin inner surface 124 of the barrel skin 122 in the as-designed object configuration 262.

FIG. 18 is a sectional view of the barrel section 116 of FIG. 16 in the additional as-built object configuration 268 of the barrel skin 122 shown in FIG. 17 corresponding to the additional clocking orientation 272. Also shown is the arcuate (e.g., circumferential) frame assembly 164 in the as-designed mating structure configuration 162 prior to final attachment to the barrel skin 122 to illustrate gaps 190 at the deviation 192 location between the arcuate frame assembly 164 and the skin inner surface 124.

FIG. 18A is a magnified view of a portion of the location of a deviation 192 of the as-built object configuration 264 from the as-designed object configuration 262 of the barrel section 116 of FIG. 18. In the example shown, although the barrel section 116 is in the optimal clocking orientation 274, out-of-tolerance gaps 190 may exist between the arcuate frame assembly 164 in the as-designed mating structure configuration 162 and the barrel skin 122 in the additional as-built object configuration 268. Shown in phantom lines are examples of shims 194 that may be required depending upon the size of the gap 190. However, in other examples when the barrel section 116 is in the optimal clocking orientation 274, no gaps may exist between the arcuate frame assembly 164 and the barrel skin 122. In still further examples when the barrel section 116 is in the optimal clocking orientation 274, gaps 190 that exist between the arcuate frame assembly 164 and the barrel skin 122 may be smaller than a minimum gap size (e.g., less than 0.008 inch), and therefore may not require shimming.

In some examples of the presently-disclosed system 240, the processor 278 may determine an optimal clocking orientation 274 that reduces the total quantity of unplanned gaps 190 between the object 260 and the mating structure 160. For example, the processor 278 may determine an optimal clocking orientation 274 that minimizes the total quantity of unplanned or out-of-tolerance gaps 190 (e.g., gaps greater than 0.008 inch). In this regard, the optimal clocking orientation 274 may minimize the total quantity of unplanned shims 194 between the object 260 and the mating structure 160, which may advantageously reduce the time and expense associated with procurement of shim stock, measurement of gaps 190, and manufacturing and/or installation of shims 194.

Alternatively or additionally, the processor 278 may determine an optimal clocking orientation 274 that reduces a maximum size of the unplanned gaps 190 between the object 260 and the mating structure 160, regardless of the total quantity of gaps 190. In this regard, the processor 278 may determine the optimal clocking orientation 274 at which all out-of-tolerance gaps 190 are smaller than a predetermined maximum gap size between the object 260 and the mating structure 160. In the example of a barrel section 116, the optimal clocking orientation 274 may minimize the size of the largest gaps 190 between the shear tie feet 176 of the arcuate frame assemblies 164 and the skin inner surface 124 of the barrel skin 122. Advantageously, minimizing the size of the largest gaps 190 may increase structural integrity, reduce preload and/or distortion on the mating components when tightening the permanent fasteners 180 attaching the shear ties 174 to the barrel skin 122, and potentially avoid the need for rework of one or more of the shear ties 174 or other mating structure 160. In addition, minimizing the size of the largest gaps 190 may avoid the need for stress analysis to determine if the thickness of a shim 194 is excessive from the standpoint of stress or loads on the object 260 or mating structure 160 such as around a permanent fastener 180.

FIG. 19 shows an arrangement of the system 240 having the same components and operating in a manner similar to the above-described arrangement shown in FIG. 12 except that in FIG. 19, the transceivers 252 are located radially inboard of an innermost radius of rotation (not shown) of the object 260, and the radiation devices 250 are mounted to the object 260 on a radially inboard side of the object 260. An innermost radius of rotation of the object 260 may be described as the smallest radius traced by a portion of the object 260 during rotation about the rotational axis 208. In the example shown, the plurality of radiation devices 250 are mounted on the interior side of the barrel skin 122. The plurality of transceivers 252 are mounted on an inner support 234. The inner support 234 may be mounted on the assembly fixture 214 (FIG. 11). The assembly fixture 214 may support the barrel section 116 during rotation of the object 260 in the manner described above.

The inner support 234 may be provided as a pole, a rod, a beam, a truss, a frame, or other support configuration extending between and/or beyond opposing ends of the barrel section 116. In some examples, the longitudinal axis (not shown) of the inner support 234 may be coaxial with the rotational axis 208 of the object 260. Although FIG. 19 illustrates each end of the inner support 234 including four transceivers 252 oriented orthogonally relative to one another, the inner support 234 may include any number of transceivers 252 mounted in any one of a variety of orientations. Preferably, the transceivers 252 are mounted such that each one of the radiation devices 250 is always within the line of sight of at least one transceiver 252 during rotation of the object 260 about the rotational axis 208

In FIG. 19, the radiation devices 250 may be mounted to the skin inner surface 124 of the barrel skin 122. For example, the radiation devices 250 may be removably secured to pre-existing holes (e.g., fastener holes, tooling holes) formed in the barrel skin 122. The radiation devices 250 may be provided in any one of the above-described configurations including active radiation devices or passive radiation devices. Likewise, the transceivers 252 may be provided in any one of the above-described configurations. The system 240 may optionally include an outer support 232 upon which one or more calibration targets 256 may be mounted. The calibration targets 256 may facilitate real-time calibration of the transceivers 252 in the same manner as described above.

Figure 20:
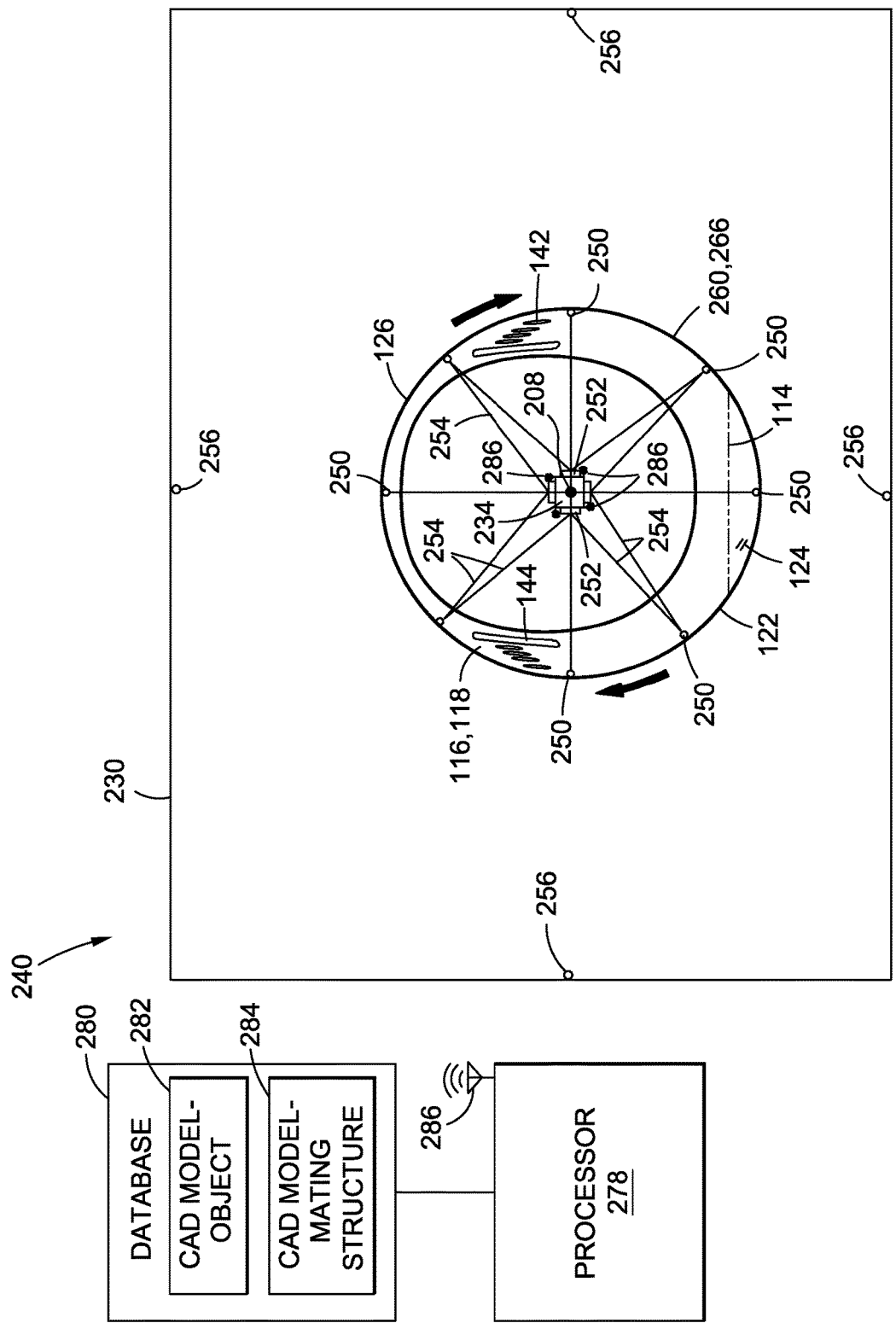
FIG. 20 is a front view of the barrel skin of FIG. 19 illustrating radiation emitted by the transceivers mounted on the inner support and configured to receive radiation from the radiation device mounted on the interior of the barrel skin.

FIG. 20 is a front view of the barrel skin 122 of FIG. 19 illustrating radiation 254 emitted by the transceivers 252 mounted on the inner support 234. In response to emitting radiation 254, the transceivers 252 receive radiation (e.g., emitted or reflected) from the radiation devices 250 mounted on the interior of the barrel skin 122. As described above, the transceivers 252 continuously generate distance measurements between each transceiver 252 in the radiation devices 250. The processor 278 may include an antenna 286 for wirelessly receiving the distance measurements transmitted (e.g., via RFID) by the antenna 286 of each transceiver 252. During rotation of the object 260, the processor 278 continuously determines unique additional as-built object configurations 268 of the barrel section 116 corresponding to the changing clocking orientations. As described above, the processor 278 continuously compares the first and the additional as-built object configurations 266, 268 of the barrel section 116 to the as-designed object configuration 262 of the barrel section 116. After completion of the rotation of the barrel section 116, the processor 278 determines the optimal clocking orientation 274 at which the as-built object configuration 264 of the barrel section 116 has the smallest deviation from the as-designed object configuration 262 of the barrel section 116.

Figure 21:
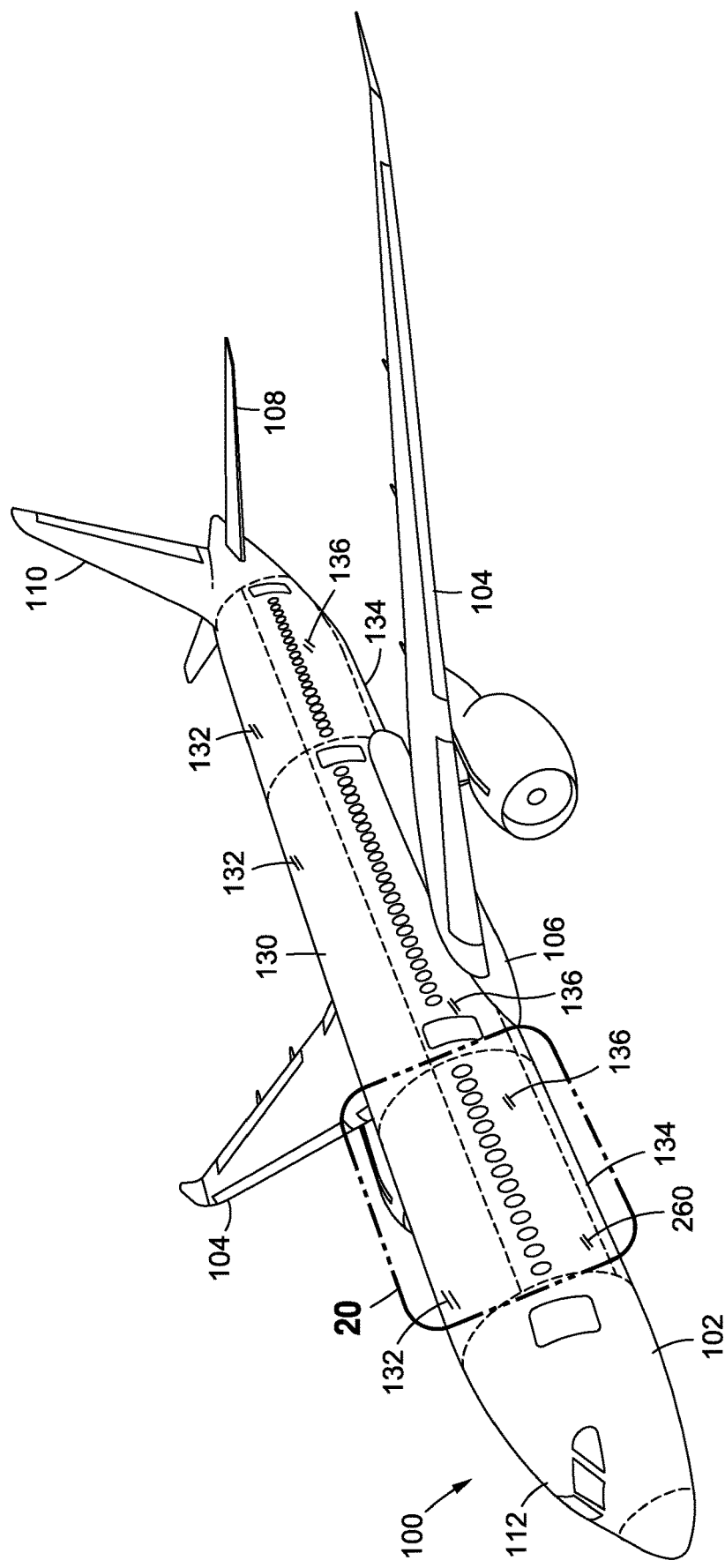
FIG. 21 is a perspective view of an aircraft wherein the fuselage is comprised of a plurality of open-cross-section panel sections which may be assembled to form a closed-cross-section of the fuselage.

FIG. 21 shows an aircraft 100 wherein the fuselage 112 is comprised of a plurality of open-cross-section aircraft structures 102. Each aircraft structure 102 is configured as a fuselage panel section 130. The panel sections 130 may be formed of composite material or metallic material. A set of panel sections 130 may be assembled along the longitudinal edges to form a closed-cross-section to form a lengthwise section of a fuselage as shown in FIG. 2. In the example of FIG. 21, the panel sections 130 may be assembled to form multiple lengthwise section of a fuselage that may be joined end-to-end to form a fuselage 112.

Figure 22:
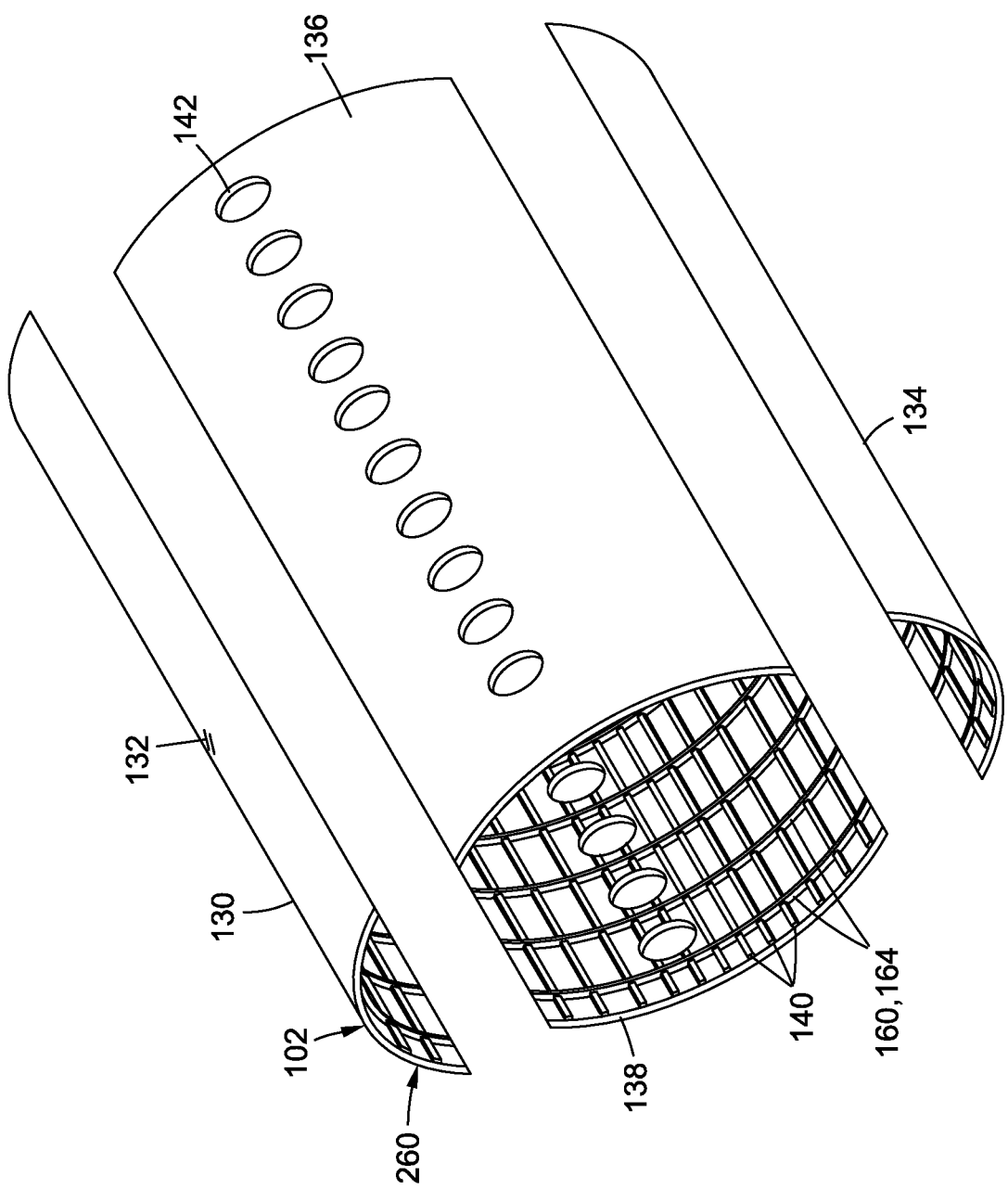
FIG. 22 is an exploded perspective view of four panel sections which may be assembled to form a closed-cross-section of the fuselage of FIG. 21.

FIG. 22 is an exploded perspective view of four (4) panel sections 130 (e.g., quarter panels) which may be assembled along the longitudinal edges. The four panel sections 130 include a crown panel 132, a keel panel 134, and two side panels 136 interconnecting the crown panel 132 and the keel panel 134. Although four panel sections 130 are shown, a lengthwise section of a fuselage may be made up of any number of panel sections 130. For example, a barrel section may be formed by splicing two semi-cylindrical panel sections 130 along the longitudinal edges. Alternatively, a fuselage section may be formed by splicing together three panel sections 130 along the longitudinal edges.

In FIG. 22, each panel section 130 may include longitudinal composite stringers 140 which may be integral with a composite panel skin 138 of the panel section 130. After fabricating each panel section 130, mating structure 160 in the form of a plurality of axially spaced arcuate frame assemblies 164 may be attached to the panel section 130. In some examples, the arcuate frame assemblies 164 may be configured similar to the example shown in FIGS. 4-6. During attachment of the arcuate frame assemblies 164, each panel section 130 may be supported on an assembly fixture 214 similar to the assembly fixture 214 illustrated in FIG. 10. Due to the manner in which each panel section 130 is fabricated and due to the manner in which each panel section 130 is supported on the assembly fixture 214 (e.g., by the opposing ends of the panel section), the panel section 130 may assume a first as-designed object configuration 262 that deviates from the as-built object configuration 264 of the panel section 130, prior to rotation of the panel section 130. Advantageously, the above-described system 240 and method 300 (FIG. 25) may be implemented for determining the optimal clocking orientation 274 into which the panel section 130 (e.g., the aircraft structure 102) may be rotated to minimize the deviation between the as-designed object configuration 262 of the panel section 130 and the as-built object configuration 264 of the panel section 130.

Figure 23:
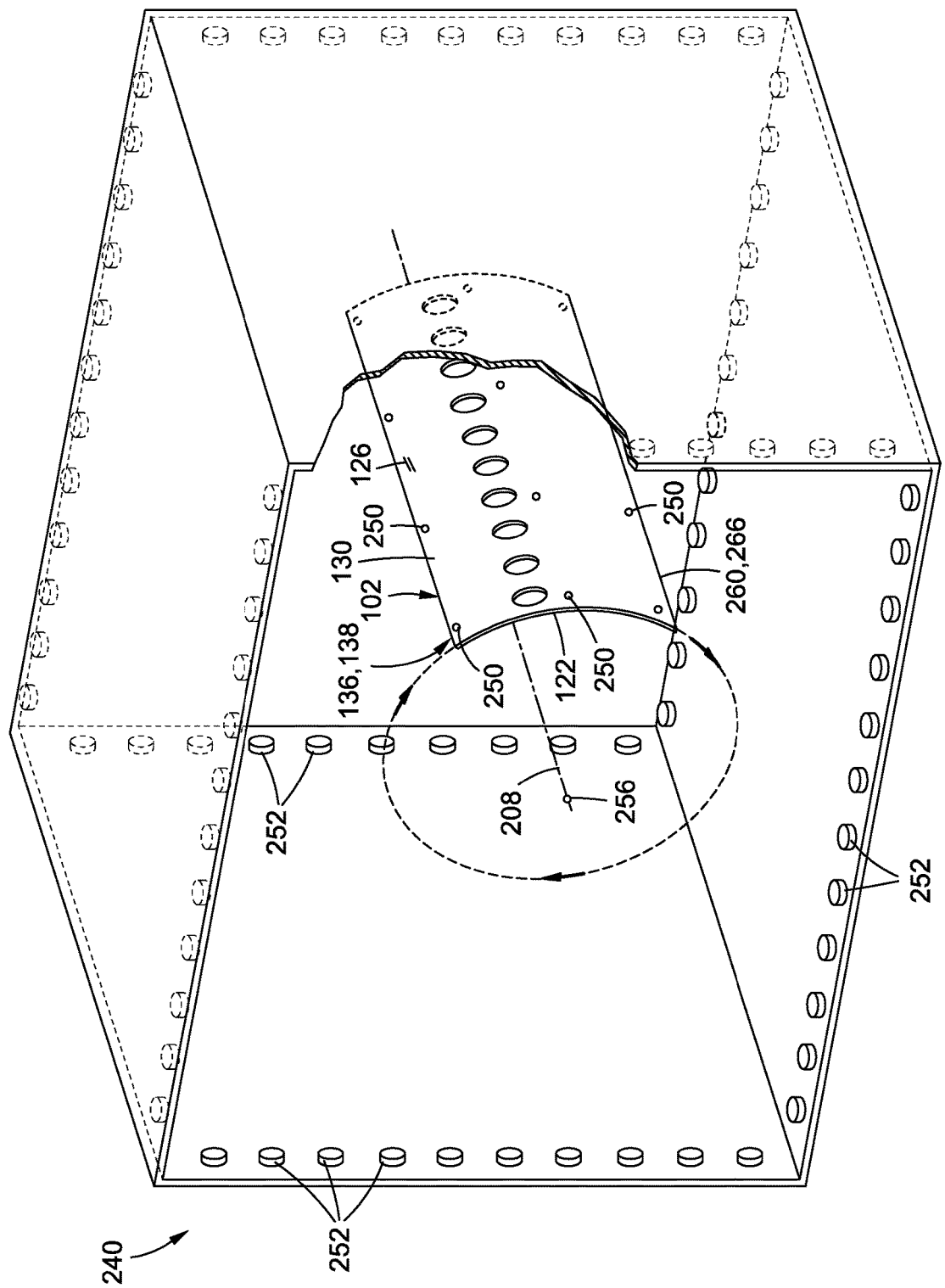
FIG. 23 is a perspective view of a panel skin of a panel section having a plurality of radiation devices mounted on the exterior of a panel skin and a plurality of transceivers mounted on an outer support.

FIG. 23 is a simplified view of a panel skin 138 of a side panel 136 with the stringers 140 omitted and showing only the panel skin 138. A plurality of radiation devices 250 are mounted on the exterior of the panel skin 138 and a plurality of transceivers 252 mounted on an outer support 232 such as on a wall, a floor, and a ceiling of a manufacturing area. However, the system 240 may be arranged such that the radiation devices 250 are mounted on the interior of the panel skin 138, and the transceivers 252 are mounted on an inner support 234, similar to the above-described arrangement shown in FIG. 19.

Figure 24:
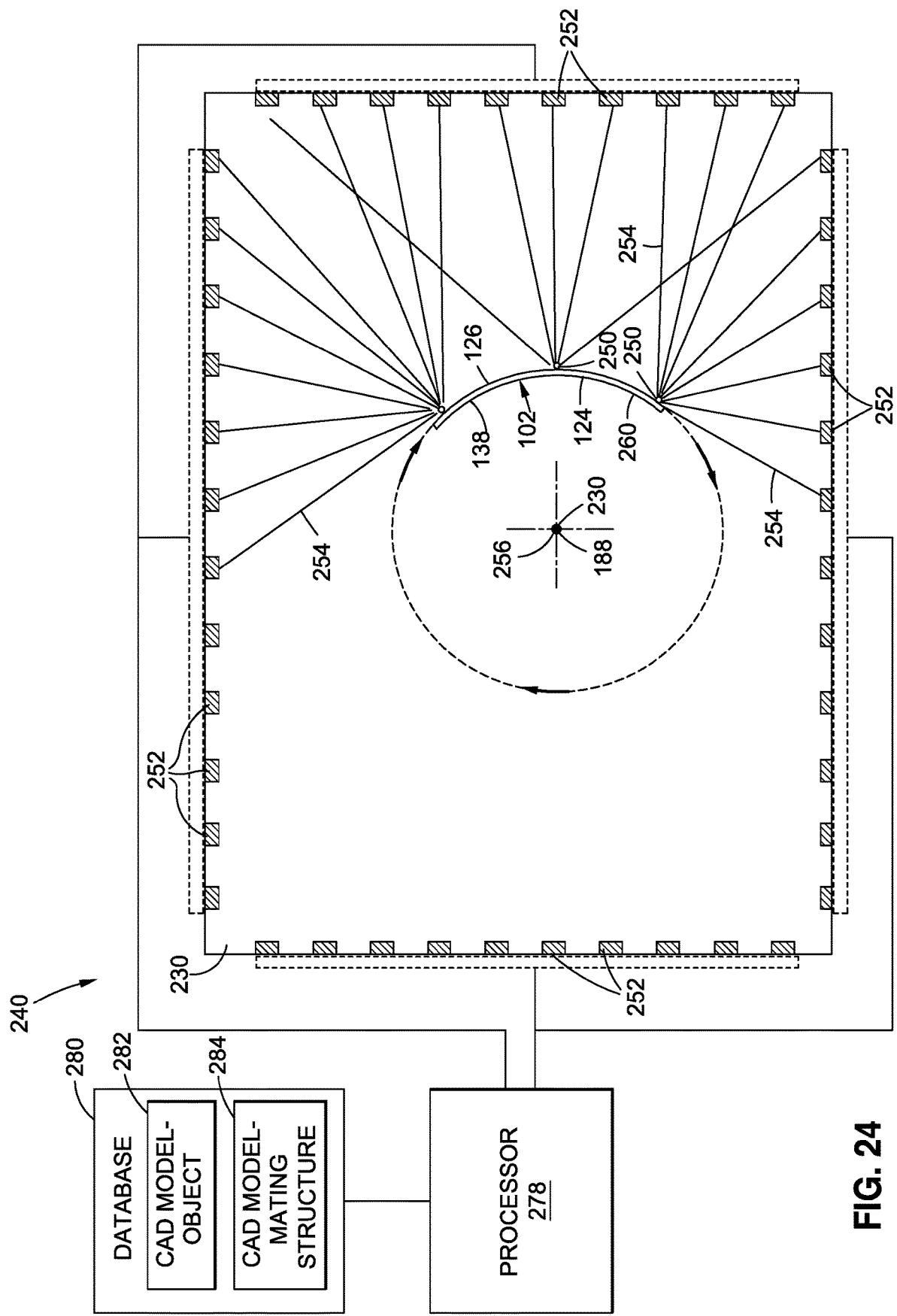
FIG. 24 is a front view of the panel skin of FIG. 23 illustrating radiation emitted by the transceivers and reflected by the radiation devices back toward the transceivers.

FIG. 24 is a front view of the panel skin 138 showing the transceivers 252 emitting radiation 254 toward the radiation devices 250 for continuously generating distance measurements between the transceivers 252 and the radiation devices 250. During rotation of the panel section 130, the processor 278 may activate only the transceivers 252 that are within line of sight of the radiation devices 250. In this regard, transceivers 252 that are not within line of sight may not emit radiation 254 until the radiation devices 250 come into the field of view of the transceivers 252 during rotation of the panel section 130. As mentioned above, the processor 278 is communicatively coupled to the transceivers 252 and continuously determines, based on the distance measurements, additional unique as-built aircraft structure configurations corresponding to changing clocking orientations of the aircraft structure 102 (e.g., the panel section) during rotation. The processor 278 continuously compares the first and the additional as-built aircraft structure configurations to the as-designed aircraft structure configuration. After completion of the rotation of the panel section 130, the processor 278 determines an optimal clocking orientation 274 at which the as-built aircraft structure configuration has the smallest deviation from the as-designed aircraft structure configuration of the panel section 130.

In a manner similar to that described above with regard to FIGS. 12-18A, the processor 278 may determine the optimal clocking orientation 274 of the panel section 130 that reduces gaps 190 between the aircraft structure 102 (e.g., the panel section) and the mating structure 160 (e.g., an arcuate frame assembly 164—FIG. 22) to be mated to the aircraft structure 102 at a plurality of discrete mounting locations 182 (e.g., axial locations 184 and/or angular locations 186) with the mating structure 160 (e.g., an arcuate frame assembly 164) in the as-designed mating structure configuration 162. The processor 278 may determine the optimal clocking orientation 274 of the panel section 130 that reduces a quantity of the gaps 190 between the panel section 130 and one or more of the arcuate frame assemblies 164 to be attached to the panel section 130. Alternatively or additionally, the processor 278 may determine the optimal clocking orientation 274 of the panel section 130 that reduces the maximum size of the gaps 190 between the panel section 130 and one or more of the arcuate frame assemblies 164. However, as mentioned above, the processor 278 may be configured to determine the optimal clocking orientation 274 that reduces mismatch or gaps 190 between any type of aircraft structure 102 and any type of mating structure 160, including internal mating structure 160 and external mating structure 160. For example, the processor 278 may be configured to determine the optimal clocking orientation 274 that minimizes mismatch of abutting longitudinal edges of panel sections 130 to be joined.

Figure 25:
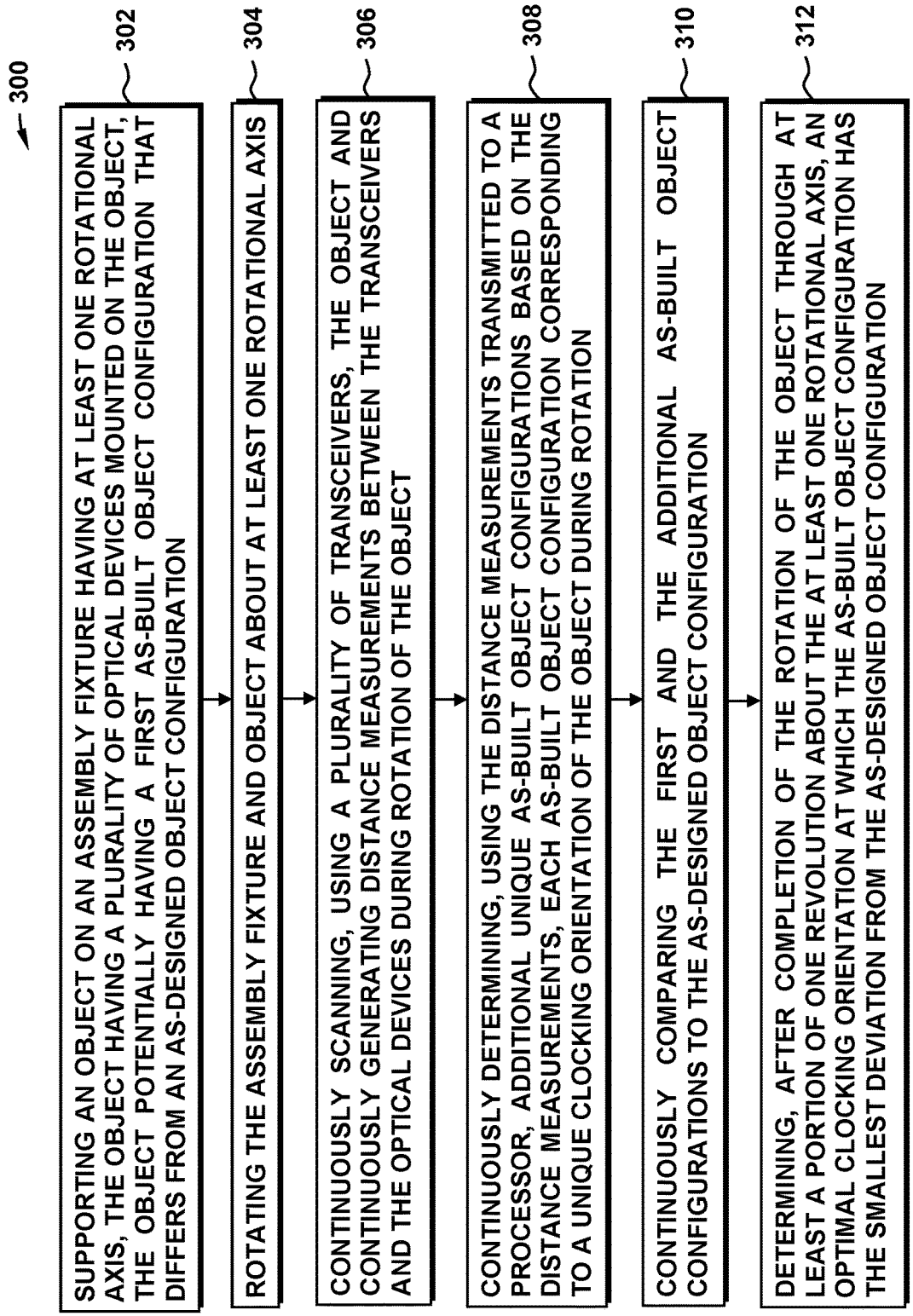
FIG. 25 is a flow diagram illustrating one or more operations that may be included in a method of determining an optimal clocking orientation of an object at which to attach mating structure to the object.

FIG. 25 is a flow diagram illustrating one or more operations that may be included in a method 300 of determining an optimal clocking orientation 274 of an object 260 at which to attach mating structure 160 to the object 260. Step 302 of the method 300 includes supporting the object 260 on an assembly fixture 214 having one or more rotational axes as described above. For example, FIG. 10 illustrates a barrel section 116 supported on the above-described assembly fixture 214 having a rotational axis 208. As described above, the object 260 has a plurality of radiation devices 250 mounted on the object 260. The object 260 potentially has a first as-built object configuration 266 that differs from an as-designed object configuration 262.

Step 302 of supporting the object 260 on the assembly fixture 214 may include supporting an object 260 having a closed cross-section when viewed along a direction parallel to the at least one rotational axis (e.g., parallel to rotational axis 208). For example, the barrel sections 116 of the fuselage 112 in FIG. 2 each have a closed cross-section generally formed as a cylinder when viewed along rotational axis 208. In FIG. 10, the aft barrel section 118 is supported at the ends, and is unsupported between the ends which may cause the barrel section 116 to assume the first as-built object configuration 266 differing from the as-designed object configuration 262.

Alternatively, Step 302 of supporting the object 260 on the assembly fixture 214 may include supporting an object 260 having an open cross-section when viewed along a direction parallel to a rotational axis. For example, the panel sections 130 of the fuselage 112 in FIG. 22 each have an open cross-section formed as a quarter panel when viewed along rotational axis 208. Although not shown, a panel section 130 may be supported by the ends on an assembly fixture 214, and may be unsupported between the ends, which may cause the panel section 130 to assume a first as-built object configuration 266 that differs from the as-designed object configuration 262 of the panel section 130.

Step 304 of the method 300 includes rotating the assembly fixture 214 and the object 260 about the rotational axis 208. In some examples, prior to rotation of the object 260, the method may include calibrating each transceiver 252 using an independent distance measurement system (not shown) such as a laser tracker. In addition, the method 300 may include establishing the offset distance (not shown) between each radiation device 250 and the barrel section 116 surface for which the as-designed object configuration 262 is to be determined, so that the processor 278 can compensate for the offset distance in the distance measurements.

Step 306 of the method 300 includes continuously scanning the object 260 using a plurality of transceivers 252 during rotation of the object 260, as shown in FIGS. 13, 20, and 24, and continuously generating distance measurements between the transceivers 252 and the radiation devices 250. As described above, the processor 278 may continuously adjust the distance measurements to account for the offset distances. In addition, the method may include calibrating the transceivers 252 in real time during rotation of the object 260. For example, prior to rotation of the object 260, an initial distance measurement from the transceiver 252 to a calibration target 256 may be determined such as by using an by an independent distance measuring system (not shown). The object 260 may then be rotated about the rotational axis 208 during which subsequent distance measurements from the transceiver 252 to the calibration target 256 may be continuously generated by the transceivers 252. The real-time calibration of the transceivers 252 may include continuously comparing subsequent distance measurements to the initial distance measurement, and continuously determining whether a transceiver 252 is out-of-tolerance based on the continuous comparison of the subsequent distance measurements to the initial distance measurement. The method 300 may include continuously compensating for the subsequent distance measurements generated by a transceiver 252 that is out of tolerance.

Referring briefly to the above-described FIGS. 13 and 24, in an embodiment, Step 306 may include continuously scanning the object 260 using transceivers 252 located radially outboard of an outermost radius of rotation of the object 260. The transceivers 252 may emit radiation 254 toward radiation devices 250 mounted on a radially outboard side of the object 260. For example, in FIG. 13, the radiation devices 250 are mounted on the skin outer surface 126, and the transceivers 252 are mounted on the outer support 232.

Referring briefly to the above-described FIG. 20, in a further embodiment, Step 306 may include continuously scanning the object 260 using transceivers 252 located radially inboard of an innermost radius of rotation of the object 260 and emitting radiation 254 toward radiation devices 250 mounted to the object 260 on a radially inboard side of the object 260. For example, in FIG. 20, the radiation devices 250 are mounted on the skin inner surface 124 on the transceivers 252 are mounted on the inner support 234. In a still further embodiment, the method 300 may include scanning a radio-transparent object 260 using radiative transceivers located on a side of the object 260 opposite the radiation devices. For example, radiative transceivers located radially outboard of the barrel skin 122 may emit radio waves that may pass through the barrel skin 122 and impinge on radiation devices 250 mounted to the skin inner surface 124, causing the radiation devices to reflect (e.g., passive radiation devices) or emit (e.g., active radiation devices) radio waves back through the barrel skin 122 toward the radiative transceivers. Although not shown, the continuous scanning of the object 260 may be performed using transceivers 252 located both radially inboard of the innermost radius of rotation and radially outboard of the outermost radius of rotation of the object 260. The transceivers 252 may be configured to emit radiation 254 toward radiation devices 250 mounted on both a radially inboard side of the object 260 and on a radially outward side of the object 260.

Step 306 of continuously scanning the object 260 comprises continuously scanning the object 260 using at least one of laser transceivers, light-emitting-diode transceivers, and/or radiative transceivers as described above. In addition, the distance measurements may be generated by transceivers 252 operating under any one of a variety of different modalities including, but not limited to, the above-described time-of-flight laser scanning or triangulation laser scanning. In one example, the transceivers 252 may be light-emitting-diode (LED) transceivers operated as time-of-flight laser scanners.

Step 308 of the method 300 includes continuously determining, using the processor 278, additional unique as-built object configurations 264 based on the distance measurements generated by the transceivers 252. As mentioned above, each as-built object configuration 264 determined by the processor 278 corresponds to a unique clocking orientation of the object 260 during rotation about the rotational axis 208. A theoretically infinite number of as-built object configurations 264 may be determined by the processor 278 for a corresponding infinite number of clocking orientations of the object 260.

Step 310 of the method 300 includes continuously comparing, using the processor 278, the first and the additional as-built object configurations 266, 268 to the as-designed object configuration 262. The continuous comparison of the as-built object configurations 264 to the as-designed object configuration 262 may be performed by the processor 278 in real time during rotation of the object 260. Alternatively, the as-built object configurations 264 may be determined in lag time to the rotation of the object 260. For example, the as-built object configurations 264 may be determined after completion of the rotation of the object 260 through at least a portion of a 360-degree revolution about one or more rotational axes, or through one or more complete 360-degree revolutions about one or more rotational axes.

Step 312 of the method 300 includes determining, after completion of the rotation of the object 260, at least one optimal clocking orientation 274 at which the as-built object configuration 264 has the smallest deviation from the as-designed object configuration 262. For example, the method may include determining, using the processor 278, an optimal clocking orientation 274 that reduces gaps 190 between the object 260 and the mating structure 160 to be mated to the object 260 at one or more discrete mounting locations 182 with the mating structure 160 in an as-designed mating structure configuration 162. The mating structure 160 in the as-designed mating structure configuration 162 may be complementary to the object 260 in the as-designed object configuration 262. For example, in the context of a barrel section 116, the contour of the shear tie feet 176 around the circumference of an arcuate frame assembly 164 in the as-designed mating structure configuration 162 may be substantially equivalent to the contour of the skin inner surface 124 of the barrel skin 122 in the as-designed object configuration 262.

As described above, determining one or more optimal clocking orientations 274 that reduces gaps 190 may include determining an optimal clocking orientation 274 that reduces the quantity of the gaps 190 between the object 260 and the mating structure 160 and/or the maximum size of the gaps 190 between the object 260 and the mating structure 160. For example, the processor 278 may determine an optimal clocking orientation 274 of the barrel section 116 that reduces the total quantity of gaps 190 between the arcuate frame assemblies 164 and the skin inner surface 124. However, the size of the gaps 190 may be excessively large and may require manufacturing (e.g., machining) of custom shims and or rework of at least a portion of the arcuate frame assembly 164. Alternatively, the processor 278 may determine an optimal clocking orientation 274 for the barrel section 116 that reduces the maximum size of the gaps 190 between the arcuate frame assemblies 164 and the skin inner surface 124. However, the total quantity of gaps 190 may be excessively large requiring time-consuming process of measuring and installing structural peel-ply laminated shims 194. As may be appreciated, one or more optimal locking orientations may be determined based on any one of a variety of different optimization parameters, and is not limited to the above-described parameters of minimizing the gap quantity and/or the gap size between an object 260 and the mating structure 160.

Advantageously, the technical effect of the presently-disclosed system 240 and method 300 is an improvement in the capability for controlling processes where components are assembled, such as the assembly of mating structures 160 to an object 260. In addition, the presently-disclosed system 240 and method 300 increases the stability and repeatability of an assembly process such as in a production line. The improvement in control capability, stability, and repeatability may result in a reduction in rework and an increase in production efficiency. In addition, once the above-described system 240 and method 300 has been implemented on a certain number of objects 260 (e.g., barrel sections 118, panel section 130), patterns may emerge regarding the magnitude and locations of deviations of the as-built object configuration 264 of the object 260 from the as-designed object configuration 262. For example, in the context of an aft barrel section 118, patterns that may emerge include the identification of a range of the optimal clocking orientations 274 that result in the lowest total quantity of gaps 190 while minimizing gap size between the aft barrel section 118 and the internal (e.g., frames, floor beams 114, etc.) and/or external (e.g., adjacent barrel sections 116) mating structure 160.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A system for determining an optimal clocking orientation of an object at which to attach mating structure to the object, comprising:
   a plurality of radiation devices mounted on an object having one or more as-built object configurations potentially different than an as-designed object configuration;
   a plurality of transceivers configured to generate distance measurements between the transceivers and the radiation devices at different clocking orientations of the object;
   a processor configured to determine, based on the distance measurements, the as-built object configurations corresponding to the different clocking orientations of the object; and
   the processor configured to compare the as-built object configurations to the as-designed object configuration and determine an optimal clocking orientation at which the as-built object configuration has the smallest deviation from the as-designed object configuration.

2. The system of claim 1, wherein:
the transceivers are configured to continuously generate distance measurements during rotation of the object about at least one rotational axis;
the processor is configured to continuously determine, based on the distance measurements, the as-built object configurations corresponding to changing clock orientations of the object during rotation; and
the processor is configured to continuously compare the as-built object configurations to the as-designed object configuration.

3. The system of claim 1, wherein:
the processor is configured to determine, after completion of rotation of the object through at least one complete revolution, the clocking orientation at which the as-built object configuration has the smallest deviation from the as-designed object configuration.

4. The system of claim 1, wherein:
the transceivers are configured to continuously generate distance measurements during rotation of the object about two or more rotational axes.

5. The system of claim 1, wherein:
the processor is configured to determine the clocking orientation that reduces gaps between the object and a mating structure to be mated to the object at one or more discrete mounting locations with the mating structure in an as-designed mating structure configuration; and
the mating structure in the as-designed mating structure configuration being complementary to the object in the as-designed object configuration.

6. The system of claim 5, wherein the processor is configured to determine the clocking orientation that reduces gaps according to at least one of the following:
reduces a quantity of the gaps between the object and a mating structure; and
reduces a maximum size of the gaps between the object and the mating structure.

7. The system of claim 1, wherein the processor is configured to calibrate at least one transceiver during rotation of the object by:
continuously comparing subsequent distance measurements to a calibration target generated by the transceiver during object rotation to an initial distance measurement to the calibration target generated by the transceiver prior to object rotation;
continuously determining, based on continuous comparison of the subsequent distance measurements to the initial distance measurement, whether the transceiver is out of tolerance; and
continuously compensating for subsequent distance measurements generated by the transceiver if the transceiver is out of tolerance.

8. The system of claim 1, wherein the transceivers and radiation devices are configured in one of the following two arrangements:
at least some of the transceivers are located radially outboard of an outermost radius of rotation of the object, and at least some of the radiation devices are mounted to the object on a radially outboard side of the object; and
at least some of the transceivers are located radially inboard of an innermost radius of rotation of the object, and at least some of the radiation devices are mounted to the object on a radially inboard side of the object.

9. A system for determining an optimal clocking orientation of an aircraft structure at which to attach one or more arcuate frame assemblies to the aircraft structure, comprising:
a plurality of radiation devices mounted on an aircraft structure, the aircraft structure having one or more as-built aircraft structure configurations potentially different than an as-designed aircraft structure configuration;
a plurality of transceivers configured to generate distance measurements between the transceivers and the radiation devices at different clocking orientations of the aircraft structure;
a processor configured to continuously determine, based on the distance measurements, the as-built aircraft structure configurations corresponding to the different clocking orientations of the aircraft structure; and
the processor configured to compare the as-built aircraft structure configurations to the as-designed aircraft structure configuration and determine an optimal clocking orientation at which the as-built aircraft structure configuration has the smallest deviation from the as-designed aircraft structure configuration.

10. The system of claim 9, wherein:
the processor is configured to determine the clocking orientation of the aircraft structure that reduces gaps between the aircraft structure and an arcuate frame assembly to be mated to the aircraft structure at a plurality of discrete mounting locations with the arcuate frame assembly in an as-designed configuration.

11. A method of determining an optimal clocking orientation of an object at which to attach mating structure to the object, comprising:
rotating an object on an assembly fixture, the object having a plurality of radiation devices and having one or more as-built object configurations potentially different than an as-designed object configuration;
generating, using a plurality of transceivers, distance measurements between the transceivers and the radiation devices on the object at different clocking orientations;
determining, based on the distance measurements, the as-built object configurations corresponding to the different clocking orientation of the object;
comparing the as-built object configurations to the as-designed object configuration; and
determining the optimal clocking orientation at which the as-built object configuration has the smallest deviation from the as-designed object configuration.

12. The method of claim 11, wherein the steps of generating the distance measurements, determining the as-built object configurations, and comparing the as-built object configurations to the as-designed object configuration respectively comprise:
continuously generating the distance measurements during rotation of the object about at least one rotational axis;
continuously determining, based on the distance measurements, the as-built object configurations corresponding to different clock orientations of the object during rotation; and
continuously comparing the as-built object configurations to the as-designed object configuration.

13. The method of claim 11, wherein the step of determining the clocking orientation at which the as-built object configuration has the smallest deviation from the as-designed object configuration respectively comprise:

determining, after rotating the object through at least one complete revolution, the clocking orientation at which the as-built object configuration has the smallest deviation from the as-designed object configuration.

14. The method of claim 11, wherein the step of continuously generating the distance measurements comprises:
    continuously generating the distance measurements during rotation of the object about the two or more rotational axes.

15. The method of claim 11, wherein the step of determining the clocking orientation comprises:
    determining the clocking orientation that reduces gaps between the object and a mating structure to be mated to the object at one or more discrete mounting locations with the mating structure in an as-designed mating structure configuration; and
    the mating structure in the as-designed mating structure configuration being complementary to the object in the as-designed object configuration.

16. The method of claim 11, wherein the step of determining the clocking orientation that reduces gaps between the object and a mating structure comprises:
    determining the clocking orientation that reduces gaps according to at least one of the following:
        reduces a quantity of the gaps between the object and the mating structure; and
        reduces a maximum size of the gaps between the object and the mating structure.

17. The method of claim 11, further including calibrating at least one transceiver during rotation of the object by performing the following:
    generating, prior to rotation of the object, an initial distance measurement from the transceiver to a fixed calibration target;
    continuously generating, during rotation of the object, subsequent distance measurements from the transceiver to the fixed calibration target
    continuously comparing subsequent distance measurements to the initial distance measurement;
    continuously determining, based on continuous comparison of the subsequent distance measurements to the initial distance measurement, whether the transceiver is out of tolerance; and
    continuously compensating for subsequent distance measurements generated by the transceiver if the transceiver is out of tolerance.

18. The method of claim 11, wherein the step of continuously scanning the object includes:
    continuously scanning the object using transceivers located radially outboard of an outermost radius of rotation of the object and emitting radiation toward radiation devices mounted to the object on a radially outboard side of the object.

19. The method of claim 11, wherein the step of continuously scanning the object includes:
    continuously scanning the object using transceivers located radially inboard of an innermost radius of rotation of the object and emitting radiation toward radiation devices mounted to the object on a radially inboard side of the object.

20. The method of claim 11, further comprising:
    supporting the object on the assembly fixture, the object having a closed cross-section when viewed along a direction parallel to the at least one rotational axis.

* * * * *